United States Patent
Uchiyama et al.

(10) Patent No.: US 10,667,269 B2
(45) Date of Patent: May 26, 2020

(54) DEVICE AND METHOD

(71) Applicant: SONY CORPORATION, Tokyo (JP)

(72) Inventors: Hiromasa Uchiyama, Tokyo (JP);
Atsushi Yoshizawa, Kanagawa (JP);
Ryota Kimura, Tokyo (JP); Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 26 days.

(21) Appl. No.: 15/516,779

(22) PCT Filed: Sep. 14, 2015

(86) PCT No.: PCT/JP2015/076066
§ 371 (c)(1),
(2) Date: Apr. 4, 2017

(87) PCT Pub. No.: WO2016/084460
PCT Pub. Date: Jun. 2, 2016

(65) Prior Publication Data
US 2018/0227903 A1 Aug. 9, 2018

(30) Foreign Application Priority Data
Nov. 28, 2014 (JP) ................................ 2014-241393

(51) Int. Cl.
*H04W 72/04* (2009.01)
*H04W 52/34* (2009.01)
(Continued)

(52) U.S. Cl.
CPC ........... *H04W 72/048* (2013.01); *H04J 15/00* (2013.01); *H04W 52/346* (2013.01);
(Continued)

(58) Field of Classification Search
CPC . H04W 72/048; H04W 52/346; H04W 72/04; H04W 72/0446; H04W 72/121
See application file for complete search history.

(56) References Cited

U.S. PATENT DOCUMENTS

2001/0015756 A1* 8/2001 Wilcock ................... H04N 7/18
2003/0139186 A1* 7/2003 Igarashi ................... H04Q 7/20
(Continued)

FOREIGN PATENT DOCUMENTS

| JP | 2006-50545 A | 2/2006 |
|---|---|---|
| JP | 2009-232464 A | 10/2009 |

(Continued)

OTHER PUBLICATIONS

Jian Dang, et al., "OFDM-IDMA with User Grouping," IEEE Transactions on Communications, vol. 61, No. 5, May 2013, pp. 1947-1955.

Tomoko Matsumoto, et al., "A Study on Resource Allocation for M2M Communication Using IDMA in LTE Uplink," Proceedings of the 2012 IEICE Communications Society Conference, 2012, (5 pages) (with partial English translation).

Xiaotian Zhou, et al., "Bipartite Matching Based User Grouping for Grouped OFDM-IDMA," IEEE Transactions on Wireless Communications, vol. 12, No. 10, Oct. 2013, pp. 5248-5257.

(Continued)

*Primary Examiner* — Ronald B Abelson
(74) *Attorney, Agent, or Firm* — Xsensus LLP

(57) ABSTRACT

[Object] To enable radio resources to be used more efficiently in non-orthogonal multiple access.
[Solution] There is provided a device including: a grouping unit configured to perform grouping of a plurality of terminal devices that support non-orthogonal multiple access on the basis of a size of transmission data of each of the plurality of terminal devices; and an allocation unit configured to allocate the same radio resources to each of groups obtained as a result of the grouping.

18 Claims, 19 Drawing Sheets

(51) Int. Cl.
*H04W 72/12* (2009.01)
*H04J 99/00* (2009.01)
*H04W 8/18* (2009.01)
*H04W 64/00* (2009.01)

(52) U.S. Cl.
CPC ....... *H04W 72/04* (2013.01); *H04W 72/0446* (2013.01); *H04W 72/121* (2013.01); *H04W 8/186* (2013.01); *H04W 64/00* (2013.01)

(56) References Cited

U.S. PATENT DOCUMENTS

| | | | |
|---|---|---|---|
| 2005/0132074 A1* | 6/2005 | Jones | G06F 15/16 |
| 2008/0062923 A1* | 3/2008 | Ponnuswamy | H04W 72/04 |
| 2009/0298523 A1 | 12/2009 | Ogawa et al. | |
| 2009/0316811 A1* | 12/2009 | Maeda | H04L 27/28 |
| 2010/0041406 A1 | 2/2010 | Kim et al. | |
| 2010/0177717 A1* | 7/2010 | Sung | H04W 72/12 |
| 2013/0136097 A1 | 5/2013 | Yu et al. | |
| 2013/0215842 A1* | 8/2013 | Han | H04W 72/042 |
| 2014/0247797 A1* | 9/2014 | Monzen | H04W 72/04 |
| 2015/0003370 A1 | 1/2015 | Yokomakura et al. | |
| 2015/0245320 A1* | 8/2015 | Chen | H04W 72/04 |
| 2015/0381336 A1* | 12/2015 | Huang | H04L 5/26 |
| 2016/0249198 A1* | 8/2016 | Kim | H04W 8/005 |

FOREIGN PATENT DOCUMENTS

| | | | | |
|---|---|---|---|---|
| JP | 2013-172169 A | | 9/2013 | |
| JP | 2013-179417 A | | 9/2013 | |
| JP | WO 2014061537 | * | 4/2014 | ............ H04W 72/04 |
| JP | 2014-99836 A | | 5/2014 | |
| JP | 2014154962 A | | 8/2014 | |
| JP | WO 2014192749 | * | 12/2014 | |

OTHER PUBLICATIONS

International Search Report dated Nov. 17, 2015 in PCT/JP2015/076066 filed Sep. 14, 2015.
Combined Singaporean Office Action and Search Report dated Mar. 20, 2018 in Singaporean Patent Application No. 11201703105R, citing documents AA through AC, AX, and AY therein, 9 pages.
Dang, J.. et al., "On Grouped OFDM-IDMA", IEEE conference of Signals, Systems and Computers (ASILOMAR), Nov. 2011, pp. 1298-1303.
Bie,H., et al., "A Hybrid Multiple Access Scheme: OFDMA-IDMA", IEEE, International Conference on Communications and Networking in China, Oct. 2006, pp. 1-3.
Combined Chinese Office Action and Search Report dated Jul. 19, 2018 in corresponding Patent Application No. 201580062867.2 (with English Translation), 18 pages.
Extended European Search Report dated Jun. 20, 2018 in corresponding European Patent Application No. 15864143.1 citing document AY therein, 11 pages.
"Justification for NOMA in New Study on Enhanced MU-MIMO and Network Assisted Interference Cancellation", NTT Docomo, Inc, 3GPP Draft; RP-141165 Justification for NOMA, 3$^{rd}$ Generation Partnership Project (3GPP), vol. TSG RAN, no. Edinburgh, Scotland; Sep. 2, 2014, XP050783558, 13 pages Retrieved from the Internet: URL:http://www.3gpp.org/ftp/Meetings_3GPP_SYNC/RAN/Docs/ [retrieved on Sep. 2, 2014].
Notification of Reasons for Refusal dated May 7, 2019, issued in corresponding JP Application No. 2016-561432 (with English Translation) 20 pages.
Matsumoto et al., A study on Resource Allocation for M2M Communication Using IDMA in LTE Uplink, Sep. 11-14, 2012, 2 pages.

* cited by examiner

DEVICE AND METHOD

TECHNICAL FIELD

The present invention relates to a device and a method.

BACKGROUND ART

Non-orthogonal multiple access (NOMA) has been attracting attention as a radio access technology (RAT) for a fifth generation (5G) mobile communication system following Long Term Evolution (LTE)/LTE-Advanced (LTE-A). In non-orthogonal multiple access, signals of users interfere with each other, but a signal for each user is taken out by a high-precision decoding process at the reception side. Non-orthogonal multiple access, in theory, achieves higher cell communication capability than orthogonal multiple access.

As examples of non-orthogonal multiple access, for example, there are multiple access schemes using interleave division multiple access (IDMA) and superposition coding (SPC). In such non-orthogonal multiple access, the same radio resources are allocated to a plurality of terminal devices.

Patent Literatures 1 and 2, for example, disclose technologies for allocating radio resources.

CITATION LIST

Patent Literature

Patent Literature 1: JP 2014-99836A
Patent Literature 2: JP 2009-232464A

DISCLOSURE OF INVENTION

Technical Problem

In non-orthogonal multiple access, however, radio resources can be wastefully used. As an example, when the same radio resources are allocated to a certain terminal device and another terminal device, sizes of transmission data transmitted using the radio resources can be significantly different between the certain terminal device and the other terminal device. In this case, more radio resources than necessary are used to transmit the transmission data of the smaller size, and thus the radio resources can be said to be wastefully used.

Thus, it is desirable to provide a mechanism which enables radio resources to be used more efficiently in non-orthogonal multiple access.

Solution to Problem

According to the present disclosure, there is provided a device including: a grouping unit configured to perform grouping of a plurality of terminal devices that support non-orthogonal multiple access on the basis of a size of transmission data of each of the plurality of terminal devices; and an allocation unit configured to allocate the same radio resources to each of groups obtained as a result of the grouping.

Further, according to the present disclosure, there is provided a method performed by a processor, the method including: performing grouping of a plurality of terminal devices that support non-orthogonal multiple access on the basis of a size of transmission data of each of the plurality of terminal devices; and allocating the same radio resources to each of groups obtained as a result of the grouping.

Further, according to the present disclosure, there is provided a device including: an acquisition unit configured to acquire information indicating radio resources to be allocated to a terminal device; and a communication processing unit configured to perform a process for transmitting or receiving transmission data of the terminal device using the radio resources. The terminal device is included in a plurality of terminal devices that support non-orthogonal multiple access, and belongs to a group obtained as a result of grouping of the plurality of terminal devices performed on the basis of a size of transmission data of each of the plurality of terminal devices. The radio resources are radio resources allocated to one or more terminal devices that belong to the group.

Advantageous Effects of Invention

According to the present disclosure described above, radio resources can be used more efficiently in non-orthogonal multiple access. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
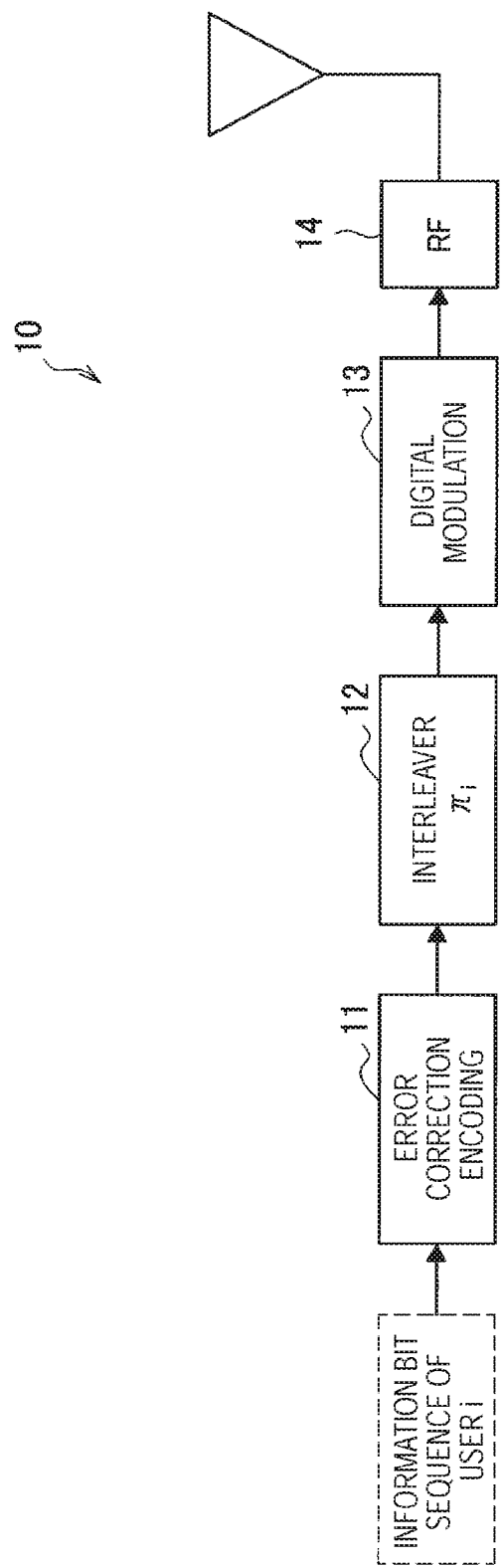
FIG. 1 is an explanatory diagram for describing an example of a configuration of a transmission device that supports IDMA.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In addition, there are cases in the present specification and the diagrams in which constituent elements having substantially the same functional configuration are distinguished from each other by affixing different letters to the same reference numbers. For example, a plurality of constituent elements having substantially the same functional configuration are distinguished, like terminal devices 200A, 200B, and 200C, if necessary. However, when there is no particular need to distinguish a plurality of constituent elements having substantially the same functional configuration from each other, only the same reference number is affixed thereto. For example, when there is no particular need to distinguish terminal devices 200A, 200B, and 200C, they are referred to simply as terminal devices 200.

Note that description will be provided in the following order.
1. Introduction
2. Schematic configuration of system
3. Configuration of each device
3.1. Configuration of base station
3.2. Configuration of terminal device
4. First embodiment
4.1. Technical features
4.2. Process flow
5. First embodiment
5.1. Technical features
5.2. Process flow
6. Application examples
6.1. Application example with respect to base station
6.2. Application example with respect to terminal device
7. Conclusion

1. Introduction

Non-orthogonal multiple access (NOMA), interleave division multiple access (IDMA), resource allocation in LTE, transmission power control in LTE, and technical problems thereof will be described with reference to FIGS. 1 to 3.

(1) Non-Orthogonal Multiple Access (NOMA)

Non-orthogonal multiple access (NOMA) has gained attention as a radio access technology (RAT) for $5^{th}$ generation (5G) mobile communication systems. In NOMA, although signals of users interfere with each other, signals of each user are taken out by high-precision decoding processes at the reception side. NOMA, in theory, can achieve a higher cell communication capability than orthogonal multiple access.

As NOMA, for example, there are multiple access schemes using interleave division multiple access (IDMA) and superposition coding (SPC). In NOMA, the same radio resources are allocated to a plurality of terminal devices.

Note that orthogonal multiple access was used before the $5^{th}$ generation (i.e., in the $1^{st}$ to $4^{th}$ generations), rather than NOMA. Orthogonal multiple access is, for example, frequency division multiple access (FDMA), time division multiple access (TDMA), code division multiple access (CDMA), orthogonal frequency division multiple access (OFDMA), or the like.

(2) Interleave Division Multiple Access (IDMA)

In IDMA, an interleaving pattern unique to a user (i.e., a terminal device) is prepared. A transmission device interleaves a transmission signal of the user (e.g., a signal transmitted by the user or a signal transmitted to the user) using the interleaving pattern. The interleaved signal is multiplexed with another interleaved signal and the result is transmitted. Meanwhile, a reception side device separates and decodes the transmission signal of the user from the multiplexed signal using a de-interleaving pattern that corresponds to the interleaving pattern.

As an advantage of IDMA, a light load on a transmission device in signal processing is exemplified. This advantage is important in particular in uplink (UL) from a user (i.e., a terminal device) to a base station.

(a) Configuration of Transmission Device

FIG. 1 is an explanatory diagram for describing an example of a configuration of a transmission device that supports IDMA. Referring to FIG. 1, the transmission device 10 has an error correction encoding circuit 11, an interleaver 12, a digital modulation circuit 13, a radio frequency (RF) circuit 14, and the like. The error correction encoding circuit 11 encodes an information bit sequence of a user i (e.g., an information bit sequence transmitted by the user i, or an information bit sequence transmitted to the user i) into error-corrected codes. The interleaver 12 is an interleaver unique to the user i (i.e., an interleaver having an interleaving pattern unique to the user i), and interleaves the encoded information bit sequence. The digital modulation circuit 13 digitally modulates the interleaved information bit sequence. The RF circuit 14 performs various processes on the signal that has undergone the digital modulation, and transmits a radio signal via an antenna.

Note that various "circuits" included in the transmission device 10 are of course not limited to physical dedicated circuits, and may be realized by a program and a processor.

(b) Configuration of Reception Device

Figure 2:
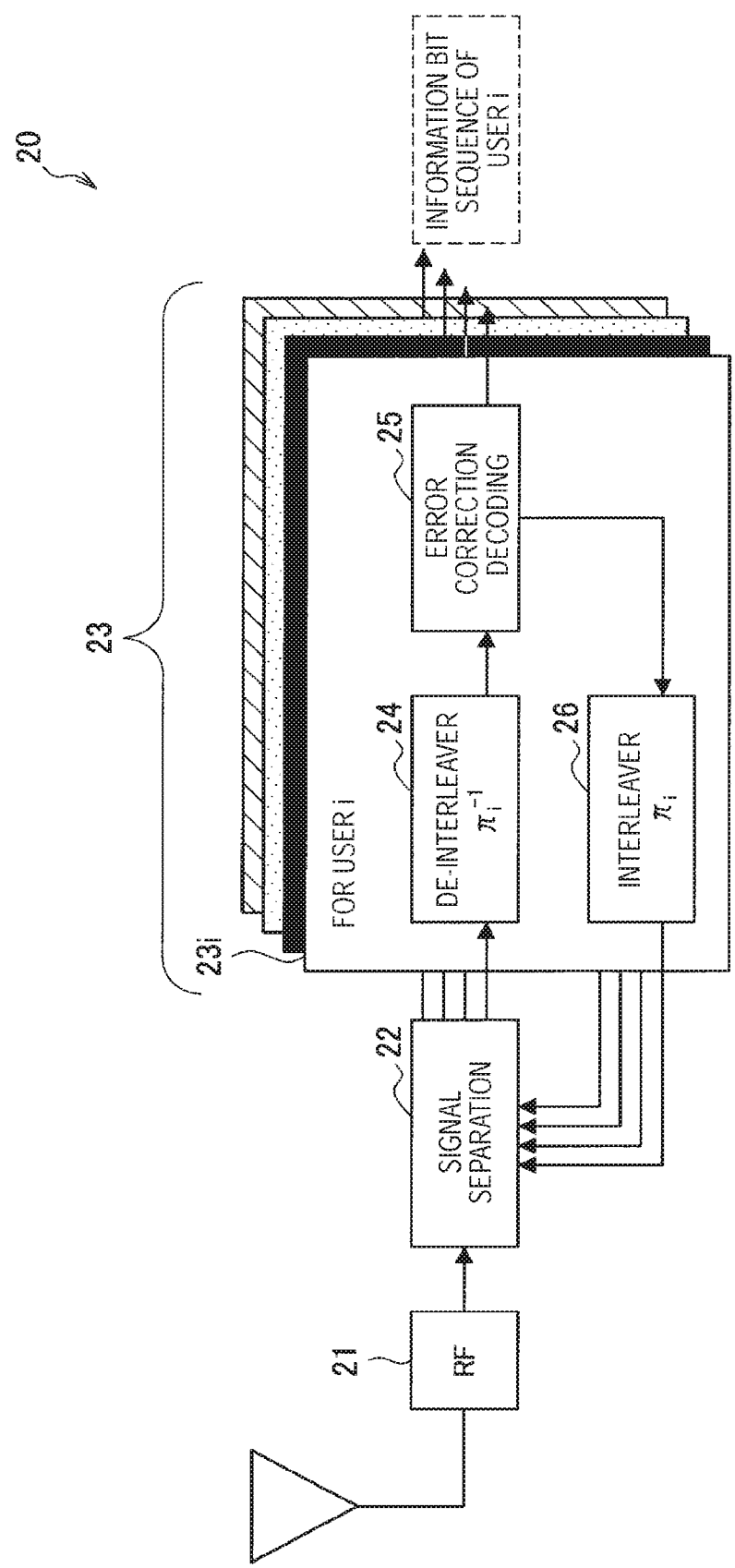
FIG. 2 is an explanatory diagram for describing an example of a configuration of a reception device that supports IDMA.

FIG. 2 is an explanatory diagram for describing an example of a configuration of a reception device that supports IDMA. Referring to FIG. 2, the reception device 20 includes an RF circuit 21, a signal separation circuit 22, and decoding circuits 23. The RF circuit 21 performs various processes on the radio signal received via an antenna, and outputs the processed signal to the signal separation circuit 22. The signal separation circuit 22 has a function of separating a signal of each user from a multiplexed signal including signals of users (e.g., a signal transmitted by each user, or a signal transmitted to each user), and outputs the separated signals of the users to the corresponding decoding circuits 23. A decoding circuit 23i includes, for example, a de-interleaver 24 unique to the user i, an error correction decoding circuit 25, and an interleaver 26 unique to the user i. The decoding circuit 23i performs, on the input signal (the signal of the user i), a de-interleaving process by the de-interleaver 24 and a decoding process by the error correction decoding circuit 25. When decoding succeeds, the decoding circuit 23i outputs an information bit sequence of the user i obtained as a result of the decoding. Further, the decoding circuit 23i interleaves the decoded signal using the interleaver 26 unique to the user i, and feeds the interleaved signal (the signal of the user i) back to the signal separation circuit 22. Such feedback is performed on, for example, signals of all the users. The signal separation circuit 22 performs signal separation again using the fed-back signal, and outputs separated signals to the decoding circuits 23 again. The reception device 20 decodes the signals of the users by repeating the signal processing in the signal separation circuit 22 and the decoding circuits 23.

Note that various "circuits" included in the reception device 20 are of course not limited to physical dedicated circuits, and may be realized by a program and a processor.

(c) OFDM-IDMA

In recent years, OFDM-IDMA which is a combination of orthogonal frequency division multiplexing (OFDM) and IDMA has gained attention as a further developed scheme of IDMA. In OFDM-IDMA, for example, IDMA is performed using multi-carriers and resource blocks (RBs) are allocated as radio resources of IDMA. Presence or absence of IDMA can be controlled in units of, for example, resource blocks. Through the combination of OFDM and IDMA, tolerance in a multi-path environment is obtained.

(3) Resource Allocation in LTE (a) Allocation of Resource Blocks

In LTE, OFDMA is used in downlink, and single carrier (SC)-FDMA is used in uplink. Radio resources are allocated to user equipment (UE) in units of resource blocks. In order not to cause interference between pieces of UE, an evolved Node B (eNB) does not allocate the same radio resources to two or more pieces of UE, but allocates radio resource to UE without overlap. A specific example of resource blocks will be described below with reference to FIG. 3.

Figure 3:
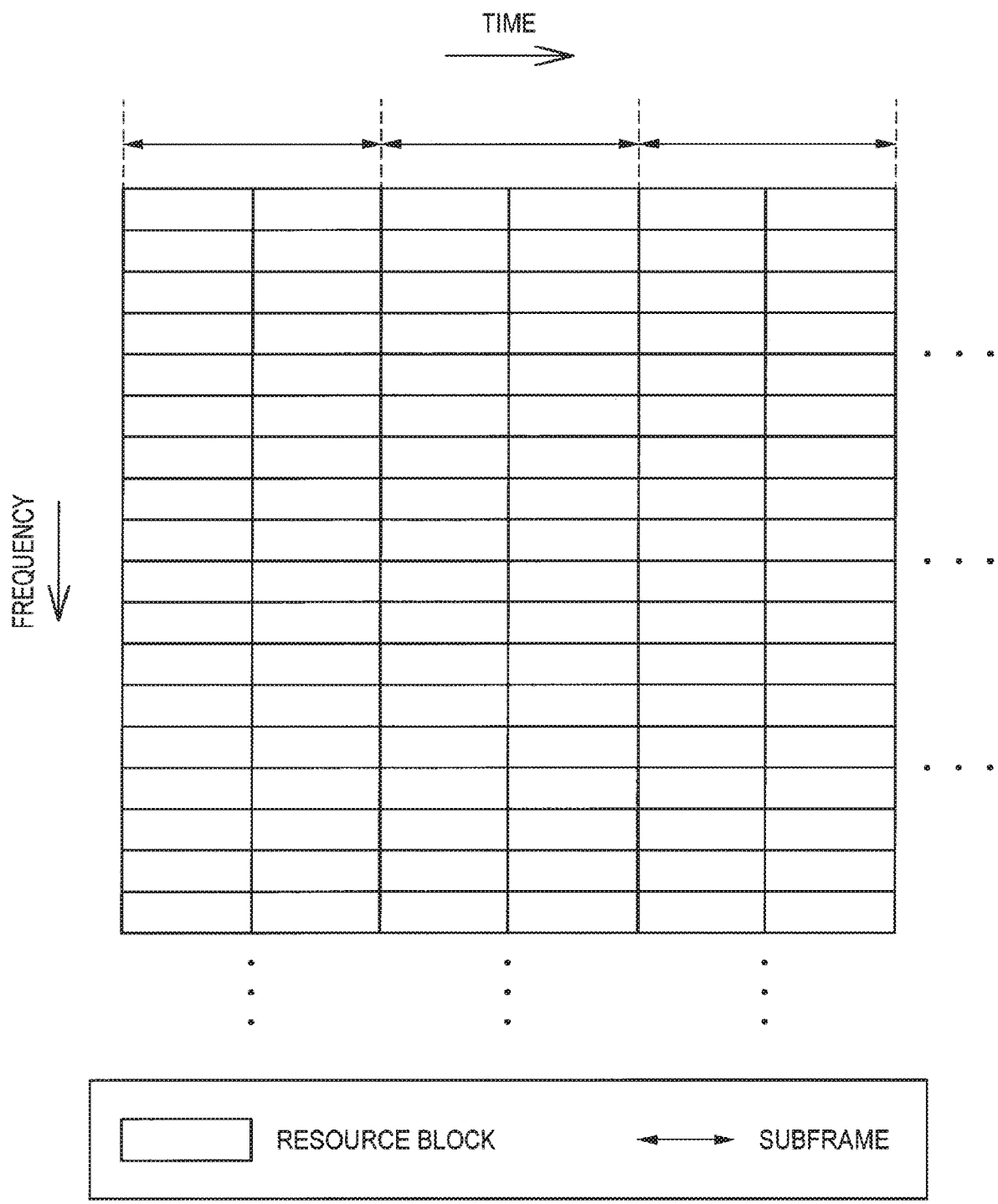
FIG. 3 is an explanatory diagram for describing an example of resource blocks in LTE.

FIG. 3 is an explanatory diagram for describing an example of resource blocks in LTE. Referring to FIG. 3, resource blocks (RBs) are shown in a frequency direction and a time direction. A resource block has, for example, a width of 12 subcarriers (180 kHz) in the frequency direction, and has a width of 1 slot (for example, 7 OFDM symbols) in the time direction. Note that 1 slot is half of 1 subframe. In LTE, such resource blocks are allocated to UE.

(b) Types of Resource Allocation

As types of resource allocation in uplink, for example, there are two types: a "resource allocation type 0" and a "resource allocation type 1."

As types of resource allocation in downlink, for example, there are three types: a "resource allocation type 0," a "resource allocation type 1," and a "resource allocation type 2." Furthermore, the "resource allocation type 2" includes "contiguous resource allocation" and "non-contiguous resource allocation."

An eNB performs resource allocation of one type of the above-described types in each of uplink and downlink.

In the "resource allocation type 0," resource blocks in a whole channel bandwidth are divided into resource block groups (RBGs), and each RBG is allocated to UE.

In the "resource allocation type 1," RBG subsets and offsets are introduced, and thus more flexible resource allocation is possible.

The "resource allocation type 2" is used only in downlink, not in uplink. The "contiguous resource allocation" enables arbitrary contiguous resource blocks to be allocated to UE. Meanwhile, the "non-contiguous resource allocation" enables non-contiguous resource blocks to be allocated to UE. Specifically, in the "non-contiguous resource allocation," virtual resource blocks (VRBs) are allocated to UE first, and after execution of interleaving, physical resource blocks (PRBs) are allocated to the UE. Accordingly, for example, an effect of randomization in a frequency direction can be obtained.

(4) Transmission Power Control in LTE

In LTE, since power consumption of UE and inter-cell interference (ICI) are major problems, transmission power control is performed mainly in uplink. As techniques of transmission power control, there are "conventional power control" and "fractional power control."

The "conventional power control" enables reception power of an eNB to be maintained uniform by simply increasing reception power of UE as the UE moves farther from the eNB.

Meanwhile, the "fractional power control" is power control in consideration of ICI. Specifically, the "fractional power control" does not compensate for a whole increase in path loss, but compensates for only a part of an increase in path loss. Accordingly, ICI at, for example, cell edges can be reduced.

(5) Technical Problems

Next, technical problems of non-orthogonal multiple access (NOMA) will be described.

(a) First Technical Problem

In non-orthogonal multiple access (NOMA), the same radio resources are allocated to a plurality of terminal devices. That is, allocated radio resources overlap between a plurality of terminal devices. As an example, in OFDM-IDMA, the same resource blocks (RBs) are allocated to a plurality of terminal devices.

In NOMA, however, radio resources can be wastefully used. As an example, when the same radio resources are allocated to a certain terminal device and another terminal device, sizes of transmission data transmitted using the radio resources can be significantly different between the certain terminal device and the other terminal device. In this case, more radio resources than necessary are used to transmit the transmission data of the smaller size, and thus the radio resources can be said to be wastefully used.

Thus, it is desirable to provide a mechanism which enables radio resources to be used more efficiently in non-orthogonal multiple access.

(b) Second Technical Problem

A terminal device that supports non-orthogonal multiple access (NOMA) and a terminal device that does not support NOMA can perform radio communication using, for example, the same frequency band. That is, a terminal device that supports NOMA and a terminal device that does not support NOMA can be present together in the same frequency band.

In this case, two or more terminal devices that support NOMA can use the same radio resources. On the other hand, a terminal device that does not support NOMA does not use radio resources used by other terminal devices (for example, other terminal devices that does not support NOMA or other terminal devices that support NOMA). As described above, a principle of allocating radio resources differs between a terminal device that supports NOMA and a terminal device that does not support NOMA. Thus, when a base station freely allocates radio resources to terminal devices that support NOMA and terminal devices that do not support NOMA, processes performed by the base station can become complicated.

Thus, it is desirable to provide a mechanism that enables radio resources to be more easily allocated to a terminal device that supports non-orthogonal multiple access and a terminal device that does not support non-orthogonal multiple access.

2. Schematic Configuration of System

Figure 4:
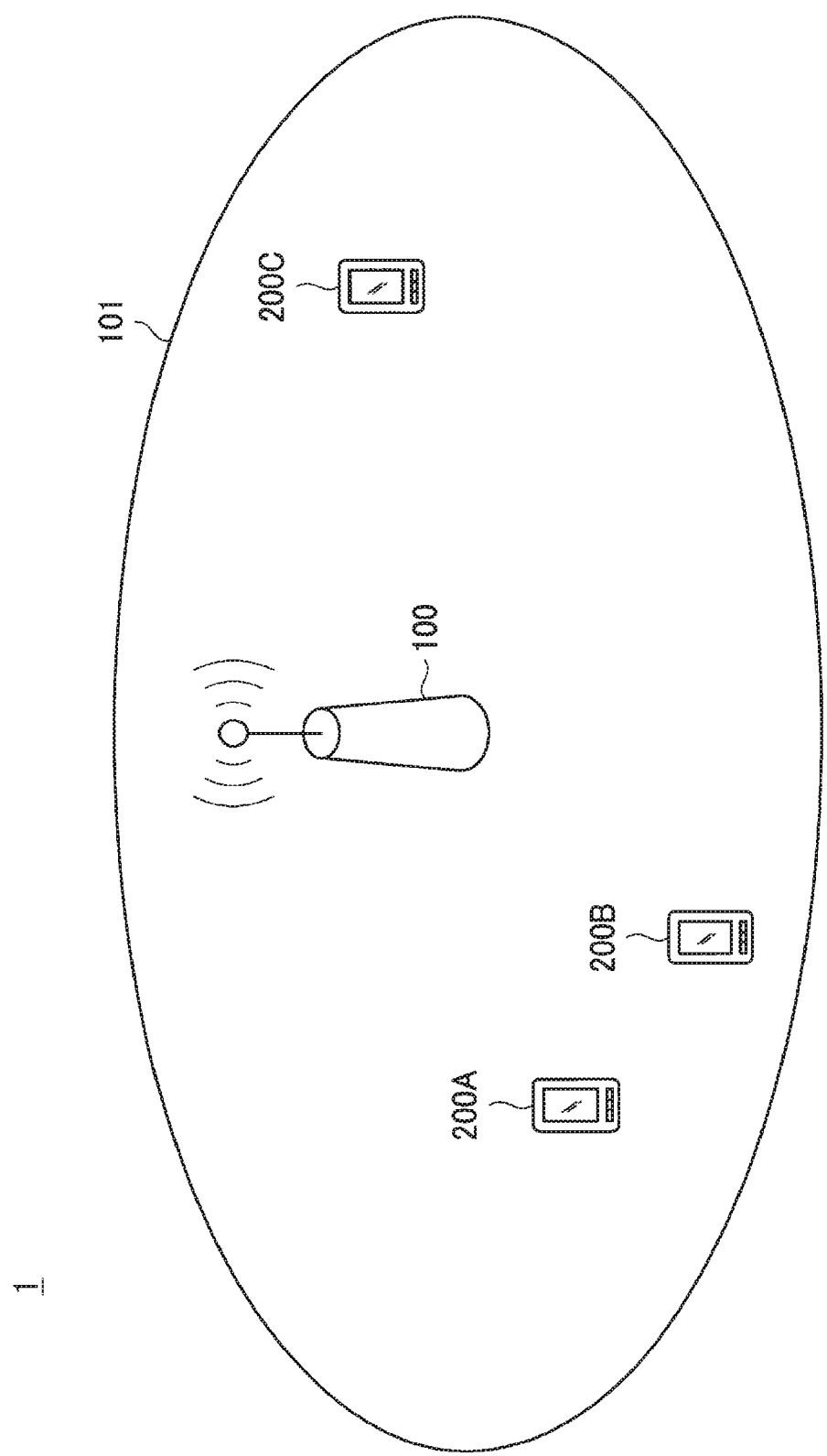
FIG. 4 is an explanatory diagram illustrating an example of the schematic configuration of a system according to an embodiment of the present disclosure.

Now, a schematic configuration of a system 1 according to an embodiment of the present disclosure will be described with reference to FIG. 4. FIG. 4 is an explanatory diagram illustrating an example of the schematic configuration of the system 1 according to an embodiment of the present disclosure. According to FIG. 4, the system 1 includes a base station 100 and a terminal device 200. Here, the terminal device 200 is also called a user. The user may also be called a user equipment (UE). Here, the UE may be a UE defined in LTE or LTE-A, or may generally refer to communication equipment.

Note that, although the three terminal devices 200 (terminal devices 200A, 200B, and 200C) are illustrated here in order to further facilitate understanding, the system 1 may include more terminal devices 200. Alternatively, the system 1 may include two or fewer terminal devices 200.

(1) Base Station 100

The base station 100 is a base station of a cellular system (or mobile communication system). The base station 100 performs radio communication with a terminal device (e.g., the terminal device 200) located in a cell 101 of the base station 100. For example, the base station 100 transmits a downlink signal to the terminal device, and receives an uplink signal from the terminal device.

(2) Terminal Device 200

The terminal device 200 can perform communication in a cellular system (or mobile communication system). The terminal device 200 performs radio communication with a base station (e.g., the base station 100) of the cellular system. For example, the terminal device 200 receives a downlink signal from the base station, and transmits an uplink signal to the base station.

(3) Multiple Access

In the embodiment of the present disclosure, in particular, the base station 100 performs radio communication with the plurality of terminal devices using non-orthogonal multiple access (NOMA).

NOMA is, for example, IDMA. More specifically, NOMA is, for example, OFDM-IDMA.

Note that NOMA is not limited to OFDM-IDMA. NOMA may be IDMA of another type, or NOMA of another type different from IDMA (for example, multiple access using SPC, or the like).

3. Configuration of Each Device

Now, configurations of the base station 100 and the terminal device 200 according to an embodiment of the present disclosure will be described with reference to FIGS. 5 and 6.

<3.1. Configuration of Base Station>

First, an example of the configuration of the base station 100 according to an embodiment of the present disclosure will be described with reference to FIG. 5. FIG. 5 is a block diagram illustrating the example of the configuration of the base station 100 according to an embodiment of the present disclosure. According to FIG. 5, the base station 100 includes an antenna unit 110, a radio communication unit 120, a network communication unit 130, a storage unit 140, and a processing unit 150.

(1) Antenna Unit 110

The antenna unit 110 radiates signals output by the radio communication unit 120 out into space as radio waves. In addition, the antenna unit 110 converts radio waves in the space into signals, and outputs the signals to the radio communication unit 120.

(2) Radio Communication Unit 120

The radio communication unit 120 transmits and receives signals. For example, the radio communication unit 120 transmits a downlink signal to a terminal device, and receives an uplink signal from a terminal device.

(3) Network Communication Unit 130

The network communication unit 130 transmits and receives information. For example, the network communication unit 130 transmits information to other nodes, and receives information from other nodes. For example, the other nodes include another base station and a core network node.

(4) Storage Unit 140

The storage unit 140 temporarily or permanently stores a program and various data for operation of the base station 100.

(5) Processing Unit 150

The processing unit 150 provides various functions of the base station 100. The processing unit 150 includes an information acquisition unit 151, a grouping unit 153, an allocation unit 155, a transmission power control unit 157, a reporting unit 159, and a communication processing unit 161. Note that the processing unit 150 may further include a structural element other than these structural elements. That is, the processing unit 150 may perform operation other than the operation of these structural elements.

Operations of the information acquisition unit 151, the grouping unit 153, the allocation unit 155, the transmission power control unit 157, the reporting unit 159, and the communication processing unit 161 will be described below.

<3.2. Configuration of Terminal Device>

First, an example of the configuration of the terminal device 200 according to an embodiment of the present disclosure will be described with reference to FIG. 6. FIG. 6 is a block diagram illustrating the example of the configuration of the terminal device 200 according to an embodiment of the present disclosure. According to FIG. 6, the terminal device 200 includes an antenna unit 210, a radio communication unit 220, a storage unit 230, and a processing unit 240.

(1) Antenna Unit 210

The antenna unit 210 radiates signals output by the radio communication unit 220 out into space as radio waves. In addition, the antenna unit 210 converts radio waves in the space into signals, and outputs the signals to the radio communication unit 220.

(2) Radio Communication Unit 220

The radio communication unit 220 transmits and receives signals. For example, the radio communication unit 220 receives a downlink signal from a base station, and transmits an uplink signal to a base station.

(3) Storage Unit 230

The storage unit 230 temporarily or permanently stores a program and various data for operation of the terminal device 200.

(4) Processing Unit 240

The processing unit 240 provides various functions of the terminal device 200. The processing unit 240 includes an information acquisition unit 241, and a communication processing unit 243. Note that the processing unit 240 may further include a structural element other than these structural elements. That is, the processing unit 240 may perform operation other than the operation of these structural elements.

Operations of the information acquisition unit 241 and the communication processing unit 243 will be described below.

4. First Embodiment

A first embodiment of the present disclosure will be described next with reference to FIGS. 7 to 14.

<4.1. Technical Features>

First, technical features of the first embodiment will be described with reference to FIGS. 7 to 12.

In the first embodiment, the base station 100 (the grouping unit 153) performs grouping of the plurality of terminal devices 200 on the basis of sizes of transmission data of each of the plurality of terminal devices 200 that support non-orthogonal multiple access (NOMA). Then, the base station 100 (the allocation unit 155) allocates the same radio resources to each of groups obtained as a result of the grouping. That is, the same radio resources are allocated to one or more terminal devices 200 that belong to the same group.

Accordingly, radio resources can be used more efficiently in, for example, NOMA.

(1) Non-Orthogonal Multiple Access (NOMA)

NOMA is, for example, IDMA. More specifically, NOMA is, for example, OFDM-IDMA.

Note that NOMA is not limited to OFDM-IDMA. NOMA may be IDMA of another type, or NOMA of another type different from IDMA (for example, multiple access using SPC, or the like).

(2) Transmission Data/Radio Resources (a) Transport Block

The above-described transmission data is, for example, a transport block. The size of the transmission data in this case is the size of a transport block.

(b) Link Direction (b-1) NOMA in Uplink

NOMA is used in, for example, uplink. The transmission data in this case is, for example, transmission data transmitted by each of the plurality of terminal devices 200, and the same radio resources are the same uplink resources. That is, the base station 100 (the grouping unit 153) performs grouping of the plurality of terminal devices 200 on the basis of the sizes of the transmission data transmitted by each of the plurality of terminal devices 200. Then, the base station 100 (the allocation unit 155) allocates the same uplink resources to each of groups obtained as a result of the grouping.

(b-2) NOMA in Downlink

Alternatively, NOMA may be used in downlink. The transmission data in this case may be transmission data transmitted to each of the plurality of terminal devices 200, and the same radio resources may be the same downlink resources. In other words, the base station 100 (the grouping unit 153) may perform grouping of the plurality of terminal devices 200 on the basis of the sizes of the transmission data transmitted to each of the plurality of terminal devices 200. Then, the base station 100 (the allocation unit 155) may allocate the same downlink resources to each of groups obtained as a result of the grouping.

(3) Acquisition of Information Indicating Data Size

The information acquisition unit 151 acquires, for example, information indicating sizes of transmission data of each of the plurality of terminal devices 200. The information may be provided by each of the plurality of terminal devices 200 to the base station 100, or may be generated by the base station 100.

(4) Frequency

The base station 100 (the grouping unit 153) performs the grouping for, for example, each subframe on the basis of the sizes of the transmission data.

Specifically, the base station 100 (the grouping unit 153) performs grouping of the plurality of terminal devices 200 on the basis of, for example, the sizes of the transmission data of each of the plurality of terminal devices 200 transmitted in subframes. Then, the base station 100 (the allocation unit 155) allocates the same radio resources within the subframes to each of groups obtained as a result of the grouping.

(5) Example of Grouping (a) First Example

As a first example, the base station 100 (the grouping unit 153) performs the grouping such that two or more terminal devices 200 whose transmission data has similar sizes belong to the same group.

A size of transmission data of the terminal device 200A, for example, is similar to a size of transmission data of the terminal device 200C, but is not similar to a size of transmission data of the terminal device 200B. In this case, the base station 100 performs grouping such that the terminal device 200A and the terminal device 200C belong to the same group and the terminal device 200B belongs to a different group.

Note that, in the embodiment of the present disclosure, "similar" may refer to a state in which "a difference (or the absolute value of a difference) does not exceed a predetermined threshold value" or "a difference (or the absolute value of a difference) is equal to or smaller than a predetermined threshold value."

(b) Second Example

As a second example, the base station 100 (the grouping unit 153) may compute an amount of radio resources necessary for transmitting transmission data on the basis of sizes of the transmission data of each of the plurality of terminal devices 200. Then, the base station 100 (the grouping unit 153) may perform the grouping on the basis of the amount of radio resources necessary for transmitting the transmission data of each of the plurality of terminal devices 200.

The base station 100 (the grouping unit 153) may perform the grouping such that two or more terminal devices 200 that require similar amounts of radio resources to transmit transmission data belong to the same group.

An amount of radio resources necessary for the terminal device 200A to transmit transmission data is, for example, similar to an amount of radio resources necessary for the terminal device 200C to transmit transmission data, and not similar to an amount of radio resources necessary for the terminal device 200B to transmit transmission data. The base station 100 in this case may perform grouping such that the terminal device 200A and the terminal device 200C belong to the same group and the terminal device 200B belongs to a different group.

Grouping is performed, for example, as described above. Accordingly, in NOMA, for example, transmission data that requires similar amounts of radio resources to be transmitted is transmitted using the same radio resources. Thus, radio resources are used more efficiently.

Note that the grouping is of course not limited to the above-described first and second examples. The grouping may be still another type (e.g., another example to be described below).

In addition, groups obtained as a result of the grouping may include not only a group to which two or more terminal devices 200 belong but also a group to which only one terminal device 200 belongs.

(6) Grouping on Basis of Other Information

The base station 100 (the grouping unit 153) may perform grouping of the plurality of terminal devices 200 on the basis of other information, in addition to sizes of the transmission data.

(a) Modulation Scheme/Coding Rate

The base station 100 (the grouping unit 153) may perform the grouping further on the basis of a combination of a modulation scheme and a coding rate applied to the transmission data. The combination may be called a modulation and coding scheme (MCS). Alternatively, the base station 100 (the grouping unit 153) may perform the grouping further on the basis of one of a modulation scheme and a coding rate applied to the transmission data.

(a-1) First Example

As a first example, the base station 100 (the grouping unit 153) may compute an amount of radio resources required to transmit transmission data on the basis of sizes of the transmission data of each of the plurality of terminal devices 200 and one or a combination of a modulation scheme and a coding rate applied to the transmission data. Then, the base station 100 (the grouping unit 153) may perform the grouping on the basis of an amount of radio resources required to transmit transmission data of each of the plurality of terminal devices 200. The base station 100 (the grouping unit 153) in this case may perform the grouping such that two or more terminal devices 200 that require similar amounts of radio resources to transmit the transmission data belong to the same group.

(a-2) Second Example

As a second example, the base station 100 (the grouping unit 153) may perform the grouping for each modulation scheme. Specifically, the base station 100 (the grouping unit 153) may select two or more terminal devices 200 among the plurality of terminal devices 200 whose transmission data is subject to the same modulation scheme and may perform grouping of the two or more terminal devices 200 on the basis of sizes of the transmission data of each of the two or more terminal devices 200 (and a coding rate applied to the transmission data). Such grouping may be performed for each modulation scheme.

(a-3) Third Example

As a third example, the base station 100 (the grouping unit 153) may perform the grouping for each coding rate. Specifically, the base station 100 (the grouping unit 153) may select two or more terminal devices 200 among the plurality of terminal devices 200 whose transmission data is subject to the same coding rate and may perform grouping of the two or more terminal devices 200 on the basis of sizes of the transmission data of each of the two or more terminal devices 200 (and a modulation scheme applied to the transmission data). Such grouping may be performed for each coding rate.

As described above, the grouping may be performed further on the basis of one or a combination of a modulation scheme and a coding rate applied to the transmission data. Accordingly, radio resources can be used more efficiently. In addition, complexity of processes can be reduced.

(b) Position-Related Information

The base station 100 (the grouping unit 153) may perform the grouping further on the basis of information regarding a position of each of the plurality of terminal devices 200 (which will be referred to hereinafter as "position-related information").

(b-1) Position-Related Information

The position-related information may include information indicating a position of each of the plurality of terminal devices 200 (which will be referred to hereinafter as "position information"). The position indicated by the position information may be a position measured using Observed Time Difference Of Arrival (OTTOA), Uplink Time Difference Of Arrival (UTDOA) and/or Terrestrial Beacon Systems (TBS). Alternatively, the position indicated by the position information may be a position measured by a Global Positioning System (GPS) receiver.

Instead of the position information (or along with the position information), the position-related information may include information indicating a timing advance (TA) of each of the plurality of terminal devices 200 and/or information indicating an angle of arrival (AoA) of each of the plurality of terminal devices 200.

(b-2) Acquisition of Position-Related Information

Each of the plurality of terminal devices 200 may provide the position-related information to the base station 100, or the base station 100 (the information acquisition unit 151) may acquire the position-related information.

(b-3) Example of Grouping

The base station 100 (the grouping unit 153) may perform the grouping such that terminal devices 200 positioned at a close distance do not belong to the same group.

The terminal device 200A is, for example, positioned at a close distance from the terminal device 200B, but is not positioned at a close distance from the terminal device 200C. The base station 100 in this case may perform grouping such that the terminal device 200A and the terminal device 200C belong to the same group and the terminal device 200B belongs to a different group.

As described above, the grouping may be performed further on the basis of the position-related information. Accordingly, channel characteristics can be more different between terminal devices 200 that belong to the same group. As a result, when NOMA is used, communication quality of individual terminal devices 200 can be more satisfactory.

(c) Processing Capability/Memory Size

The base station 100 (the grouping unit 153) may perform the grouping further on the basis of information regarding a processing capability and/or a memory size (which will be referred to hereinafter as "performance information") of each of the plurality of terminal devices 200.

(c-1) Example of Processing Capability/Memory Size

Uplink

When NOMA is used in uplink, the processing capability may be a processing capability for a transmission process, and the memory size may be a size of a memory used in the transmission process. As an example, when NOMA is IDMA, the processing capability may be a processing capability for an interleaving process, and the memory size may be a size of a memory used in the interleaving (for example, a memory for an interleaver).

Downlink

When NOMA is used in downlink, the processing capability may be a processing capability for a reception process, and the memory size may be a size of a memory used in the reception process. As an example, when NOMA is IDMA, the processing capability may be a processing capability for a de-interleaving process, and the memory size may be a size of a memory used in the de-interleaving (for example, a memory for a de-interleaver).

(c-2) Acquisition of Performance Information

Each of the plurality of terminal devices 200 may provide the performance information to the base station 100, or the base station 100 (the information acquisition unit 151) may acquire the performance information.

(c-3) Example of Grouping

The base station 100 (the grouping unit 153) may perform the grouping such that terminal devices 200 having similar processing capabilities and/or memory sizes belong to the same group.

A processing capability and/or a memory size of the terminal device 200A is, for example, similar to a processing capability and/or a memory size of the terminal device 200C and is not similar to processing capability and/or a memory size of the terminal device 200B. The base station 100 in this case may perform grouping such that the terminal device 200A and the terminal device 200C belong to the same group and the terminal device 200B belongs to a different group.

As described above, the grouping may be performed on the basis of the performance information. Accordingly, NOMA can be performed without problem in terms of performance.

(7) Resource Allocation

As described above, the base station 100 (the allocation unit 155) allocates the same radio resources to each of groups obtained as a result of the grouping.

(a) Radio Resources

The same radio resources are, for example, the same resource block.

(b) Resource Allocation and Multiple Access

When two or more terminal devices 200 belong to a group that is obtained as a result of the grouping, for example, the base station 100 (the allocation unit 155) allocates the same radio resources (e.g., the same resource block) to the two or more terminal devices 200 that belong to the group. Then, the base station 100 performs radio communication with the two or more terminal devices 200 using NOMA (e.g., OFDM-IDMA).

On the other hand, when only one terminal device 200 belongs to a group that is obtained as a result of the grouping, for example, the base station 100 (the allocation unit 155) allocates radio resources (e.g., a resource block) to the one terminal device 200 that belongs to the group. Then, the base station 100 performs radio communication with the one terminal device 200 using orthogonal multiple access (e.g., OFDMA).

(c) Example of Resource Allocation

Figure 7:
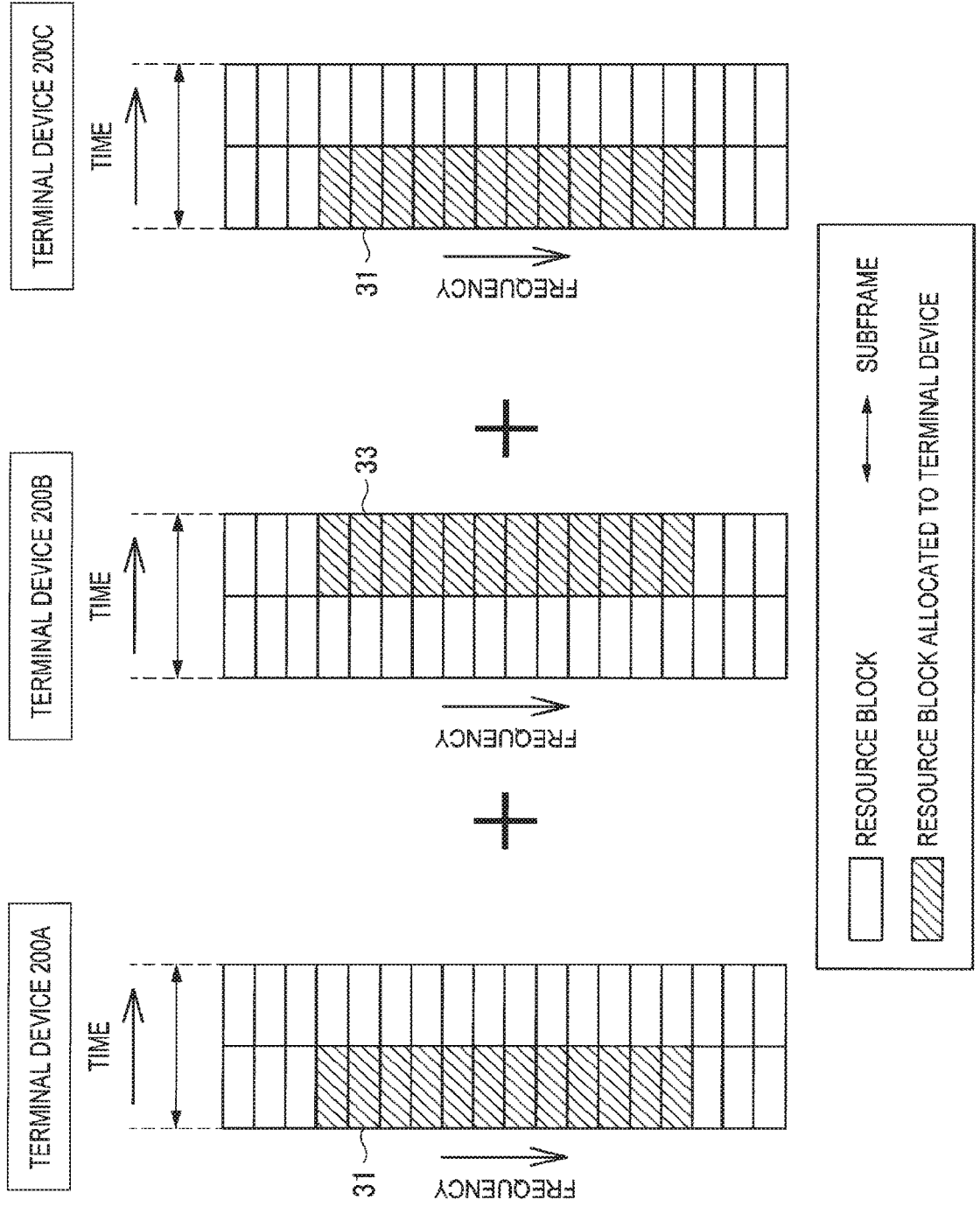
FIG. 7 is an explanatory diagram for describing a first example of resource allocation according to a first embodiment.
Figure 8:
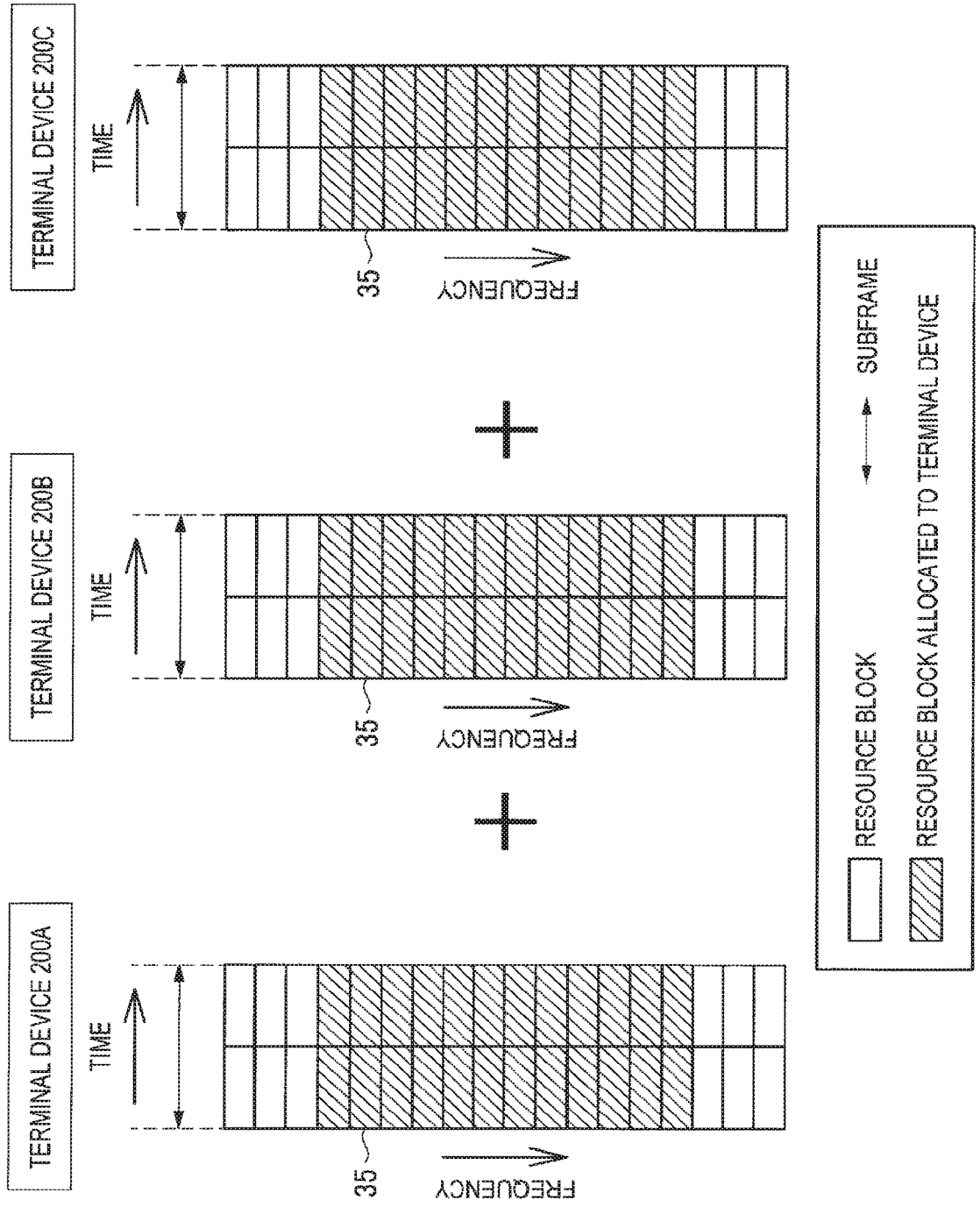
FIG. 8 is an explanatory diagram for describing a second example of resource allocation according to a first embodiment.
Figure 9:
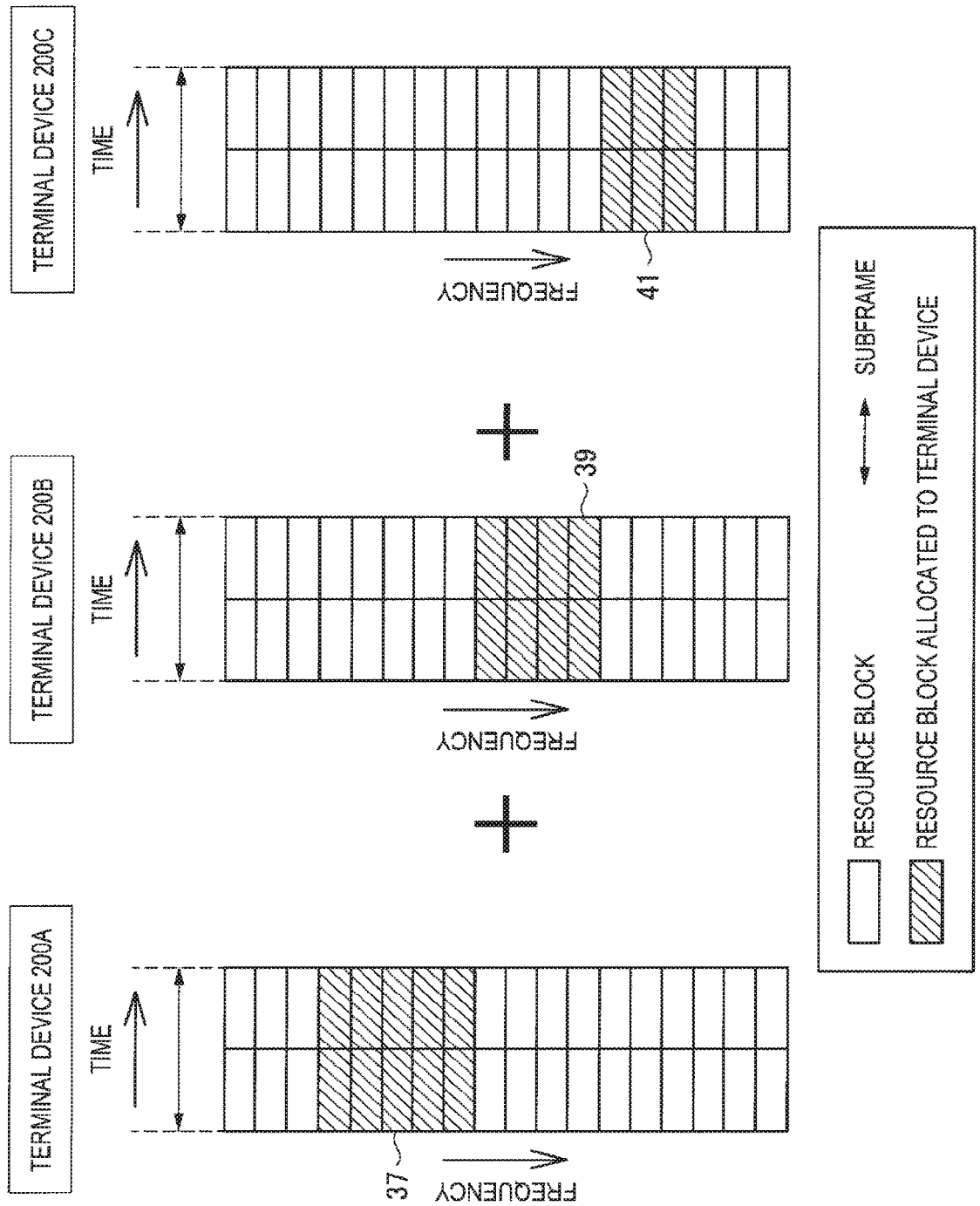
FIG. 9 is an explanatory diagram for describing a third example of resource allocation according to a first embodiment.

Examples of resource allocation according to the first embodiment will be described below with reference to FIGS. 7 to 9. FIGS. 7 to 9 are explanatory diagrams for describing first to third examples of resource allocation according to the first embodiment.

In the example of FIG. 7, the terminal device 200A and the terminal device 200C belong to the same group as a result of grouping, and the base station 100 allocates a resource block 31 to the terminal device 200A and the terminal device 200C. Meanwhile, the terminal device 200B belongs to a different group as a result of grouping, and the base station 100 allocates a resource block 33 to the terminal device 200B.

In the example of FIG. 8, the terminal device 200A, the terminal device 200B, and the terminal device 200C belong to the same group as a result of grouping, and the base station 100 allocates a resource block 35 to the terminal device 200A, the terminal device 200B, and the terminal device 200C.

In the example of FIG. 9, the terminal device 200A, the terminal device 200B, and the terminal device 200C each belong to a different group as a result of grouping. The base station 100 allocates a resource block 37 to the terminal device 200A, the base station 100 allocates a resource block 39 to the terminal device 200B, and the base station 100 allocates a resource block 41 to the terminal device 200C.

(d) Allocation of Radio Resources Included in Resource Pool

A resource pool for radio communication using NOMA may be prepared and radio resources included in the resource pool may be used for radio communication using NOMA. In this case, the same resources may be radio resources included in the resource pool for radio communication using NOMA.

(d-1) Characteristics of Resource Pool

The resource pool may be a part of radio resources of a frequency band. That is, the resource pool may be radio resources limited in at least one of a frequency direction and a time direction among the radio resources of the frequency band. The frequency band may be a component carrier.

As an example, the resource pool may be radio resources of a limited band in the frequency band.

As another example, the resource pool may be radio resources of a limited period. In this case, the resource pool may be radio resources periodically appearing in the time direction.

As still another example, the resource pool may be radio resources of a limited period and a limited band. The resource pool in this case may also be radio resources periodically appearing in the time direction.

Note that a resource pool for radio communication using NOMA may be prepared for each frequency band (e.g., for each component carrier).

(d-2) Examples of Resource Pools

Figure 10:
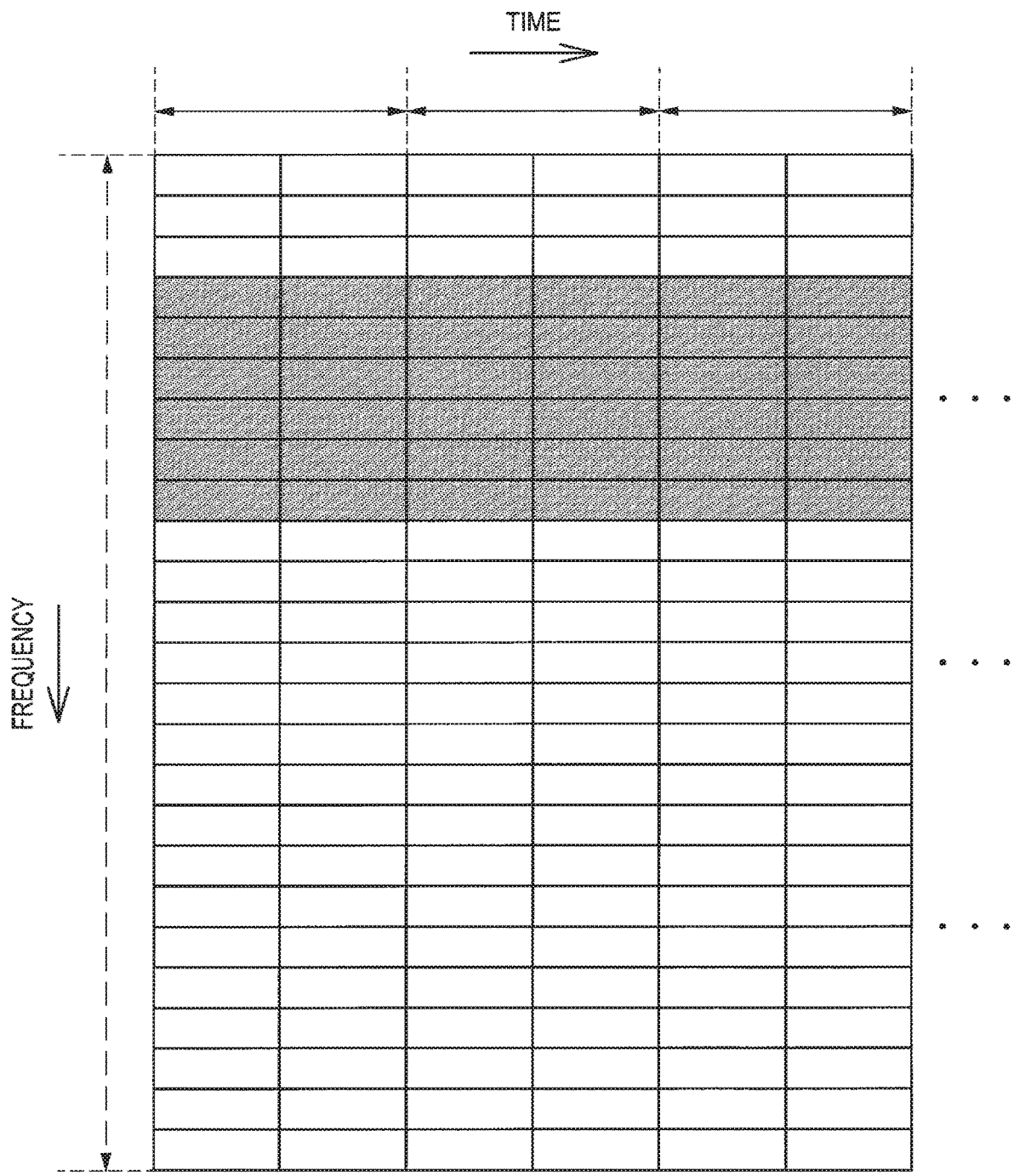
FIG. 10 is an explanatory diagram for describing a first example of a resource pool for radio communication using NOMA.
Figure 11:
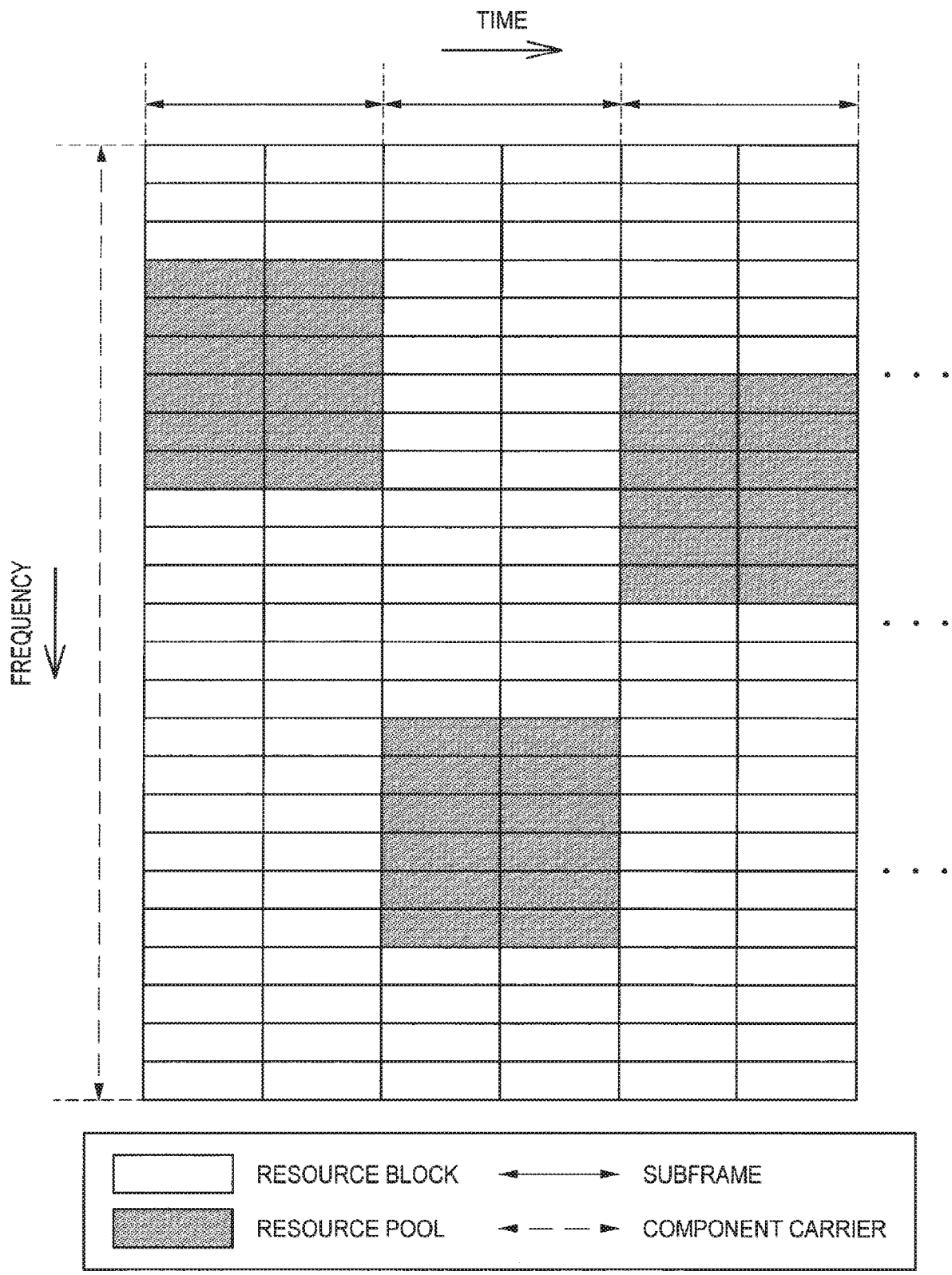
FIG. 11 is an explanatory diagram for describing a second example of a resource pool for radio communication using NOMA.
Figure 12:
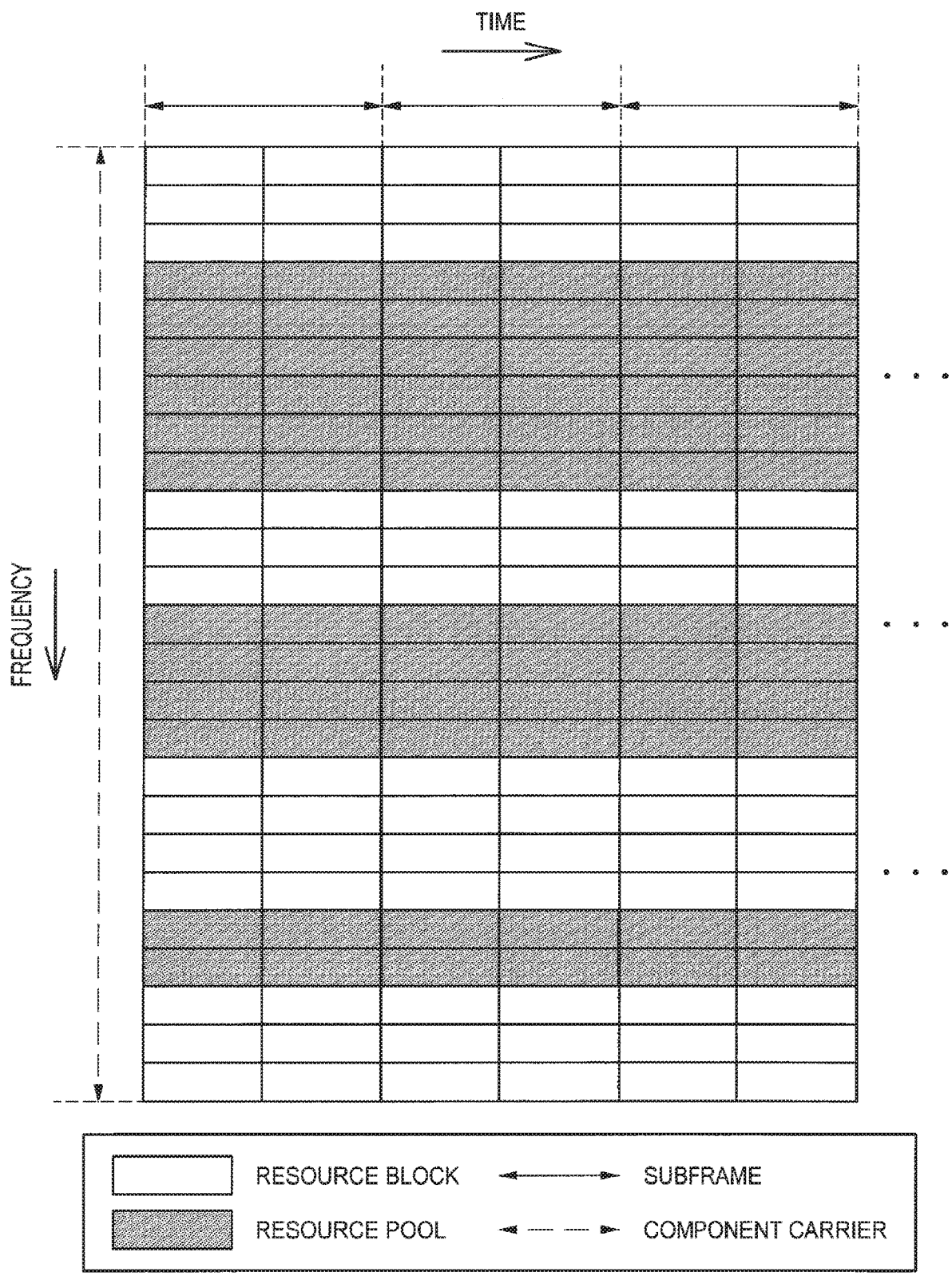
FIG. 12 is an explanatory diagram for describing a third example of a resource pool for radio communication using NOMA.

Examples of resource pools will be described below with reference to FIGS. 10 to 12. FIGS. 10 to 12 are explanatory diagrams for describing first to third examples of resource pools for radio communication using NOMA. Referring to FIGS. 10 to 12, resource blocks spanning a component carrier and 3 subframes are shown. In the examples of FIGS. 10 and 11, for example, the resource pools are resource blocks of a limited band on the component carrier. In the example of FIG. 10, in particular, the limited band is a fixed band, and the limited band of the example of FIG. 11 differs in subframes. In the example of FIG. 12, a plurality of resource pools having different bandwidths are prepared.

Note that a resource pool according to the first embodiment is of course not limited to the above-described examples. In the examples illustrated FIGS. 10 to 12, for example, although a resource pool includes resource blocks of each subframe, a resource pool may include only resource blocks of a limited period (e.g., a specific subframe).

(d-3) Allocation

The base station 100 (the allocation unit 155) allocates the same radio resources to each of groups obtained as a result of the grouping as described above. The same resources may be radio resources of the resource pool limited in at least one of a frequency direction and a time direction.

In this way, the base station 100 (the allocation unit 155) may allocate the radio resources included in the resource pool to terminal devices 200 that support NOMA. Meanwhile, the base station 100 (the allocation unit 155) may allocate other radio resources that are not included in the resource pool to another terminal device that does not support NOMA.

As described above, the radio resources included in the resource pool for radio communication using NOMA may be used. Accordingly, the radio resources can be more easily allocated to, for example, a terminal device 200 that supports NOMA and another terminal device that does not support NOMA. In addition, interference between the terminal device 200 that supports NOMA and the other terminal device that does not support NOMA can be avoided.

(8) Reporting to Terminal Device

The base station 100 reports, for example, various kinds of information to the terminal devices 200.

(a) Radio Resources

The base station 100 (the reporting unit 159) reports, for example, allocated radio resources to each of the plurality of terminal devices 200. Specifically, the base station 100 reports the radio resources included in, for example, downlink control information (DCI). The radio resources may be indicated as a bitmap in the DCI.

(b) Resource Pool

The base station 100 (the reporting unit 159) may report the resource pool to the plurality of terminal devices 200.

Specifically, the base station 100 may report the resource pool included in system information or a signaling message (e.g., a radio resource control (RRC) message) to the plurality of terminal devices 200. Alternatively, the base station 100 may report the resource pool included in the DCI to the plurality of terminal devices 200.

The resource pool may be indicated as a bitmap and/or period information in the system information, the signaling message, or the DCI. The period information may indicate radio frames and/or subframes in which the resource pool is present.

(c) Other Information

NOMA is, for example, IDMA. The base station 100 in this case reports an interleaver unique to a user (or a de-interleaver unique to a user) to each of the plurality of terminal devices 200.

Alternatively, NOMA may be multiple access using SPC. The base station 100 in this case may report information regarding power allocation to each of the plurality of terminal devices 200.

(d) Operation of Reporting Unit

The reporting unit 159 generates, for example, reporting information (DCI, system information and/or a signaling message), and the communication processing unit 161 performs a process for transmission of the reporting information. As a result, the reporting information is transmitted to the antenna unit 110 and the radio communication unit 120, and thus the above-described various kinds of information are reported to the terminal devices 200.

(9) Transmission/Reception (a) NOMA in Uplink

NOMA is used in, for example, uplink. Transmission and reception in this case will be described below.

(a-1) Terminal Device 200

A terminal device 200 (the information acquisition unit 241 thereof) acquires, for example, information indicating radio resources (i.e., uplink resources) to be allocated to the terminal device 200. Then, the terminal device 200 transmits transmission data using the radio resources.

The communication processing unit 243 of the terminal device 200 performs, for example, a process for transmitting the transmission data of the terminal device 200 using the radio resources. The process includes, for example, mapping of signals of the transmission data to the radio resources. The process includes, for example, an interleaving process of IDMA.

Note that the terminal device 200 is included in the plurality of terminal devices 200 and belongs to a group obtained as a result of the grouping of the plurality of terminal devices 200. Above radio resources are radio resources allocated to one or more terminal devices 200 that belong to the group.

(a-2) Base Station 100

The base station 100 receives, for example, transmission data transmitted by the plurality of terminal devices 200. The base station 100 receives transmission data transmitted by one or more terminal devices 200 that belong to a group using the same radio resources, for example, for each of groups obtained from the grouping.

The communication processing unit 161 of the base station 100 performs, for example, a process for receiving the transmission data of each of the one or more terminal devices 200 that belong to the group for each of the groups obtained from the grouping. The process includes, for example, de-mapping of the transmission data from the same radio resources. The process includes, for example, a de-interleaving process of IDMA.

(b) NOMA in Downlink

NOMA may be used in downlink. Transmission and reception of this case will be described below.

(b-1) Terminal Device 200

A terminal device 200 (the information acquisition unit 241 thereof) may acquire information indicating radio resources (i.e., downlink resources) allocated to the terminal device 200. Then, the terminal device 200 may receive transmission data transmitted to the terminal device 200 using the radio resources.

The communication processing unit 243 of terminal device 200 may perform a process for receiving the transmission data of the terminal device 200 using the radio resources. The process may include, for example, de-mapping of the signals of the transmission data from the radio resources, or a de-interleaving process of IDMA.

Note that the terminal device 200 is included in the plurality of terminal devices 200 and belongs to a group obtained as a result of the grouping of the plurality of terminal devices 200. Above radio resources are radio resources allocated to one or more terminal devices 200 that belong to the group.

(b-2) Base Station 100

The base station 100 may transmit transmission data to each of the plurality of terminal devices 200. The base station 100 may transmit transmission data to one or more terminal devices 200 that belong to a group for each of groups obtained from the grouping using the same radio sources.

The communication processing unit 161 of the base station 100 may perform a process for transmitting transmission data of each of the one or more terminal devices 200 that belong to the group for each of the groups obtained from the grouping. The process may include mapping of signals of the transmission data to the same radio resources. The process may include an interleaving process of IDMA.

(10) Others (Transmission Power Control)

NOMA is used in, for example, uplink. The base station 100 (the transmission power control unit 157) in this case may control transmission power of the transmission data transmitted by the two or more terminal devices 200 such that the difference in levels of reception power of the transmission data transmitted by the two or more terminal devices 200 is large when the two or more terminal devices 200 belong to a group obtained as a result of the grouping.

Specifically, the base station 100 (the transmission power control unit 157) may decide transmission power for each of the two or more terminal devices 200 such that the difference in levels of reception power of the transmission data transmitted by the two or more terminal devices 200 is large, and generate power control information for adjusting the transmission power. Then, the base station 100 (the reporting unit 159) may report the power control information to each of the two or more terminal devices 200.

Accordingly, the base station 100 can decode the transmission data of the two or more terminal devices 200 that belong to a group in descending order of the levels of the reception power. As a result, even when NOMA is used, satisfactory communication quality can be obtained.

<4.2. Process Flow>

Next, examples of flows of processes according to the first embodiment will be described with reference to FIGS. 13 and 14.

(1) NOMA in Uplink

Figure 13:
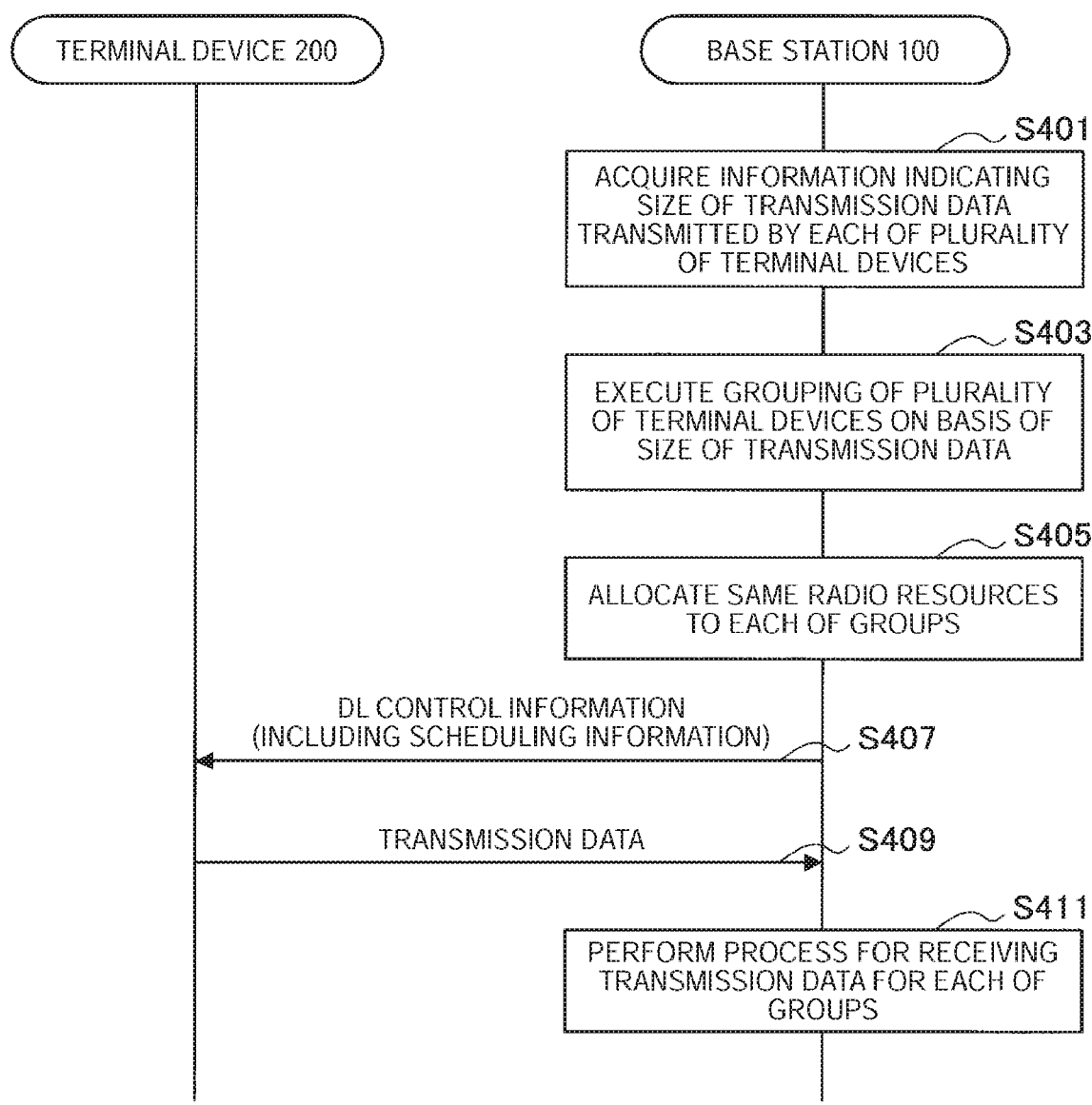
FIG. 13 is a sequence diagram showing a first example of a schematic flow of a process according to the first embodiment.

FIG. 13 is a sequence diagram showing a first example of a schematic flow of a process according to the first embodiment. The first example is an example of a case in which NOMA is used in uplink.

The base station 100 (the information acquisition unit 151) acquires information indicating sizes of transmission data to be transmitted by the plurality of respective terminal devices 200 that support NOMA (S401). The base station 100 (the information acquisition unit 151) performs grouping of the plurality of terminal devices 200 on the basis of the sizes of the transmission data (S403). Then, the base station 100 (the allocation unit 155) allocates the same radio resources (uplink resources) to each of groups obtained as a result of the grouping (S405).

The base station 100 (the reporting unit 159) reports the allocated radio resources to each of the plurality of terminal devices 200 (S407). Specifically, the base station 100 transmits, for example, downlink control information (DCI) including scheduling information to each of the plurality of terminal devices 200.

Each terminal device 200 (the information acquisition unit 151 thereof) acquires information indicating the radio resources allocated to the terminal device 200 (scheduling information). Then, the terminal device 200 transmits the transmission data using the radio resources allocated to the terminal device 200 (S409). The communication processing unit 243 of the terminal device 200 performs a process for transmitting the transmission data using the radio resources.

The base station 100 receives the transmission data transmitted by the plurality of terminal devices 200. The communication processing unit 161 of the base station 100 performs a process for receiving the transmission data of each of one or more terminal devices 200 that belong to a group for each of groups obtained from the grouping (S411).

(2) NOMA in Uplink

Figure 14:
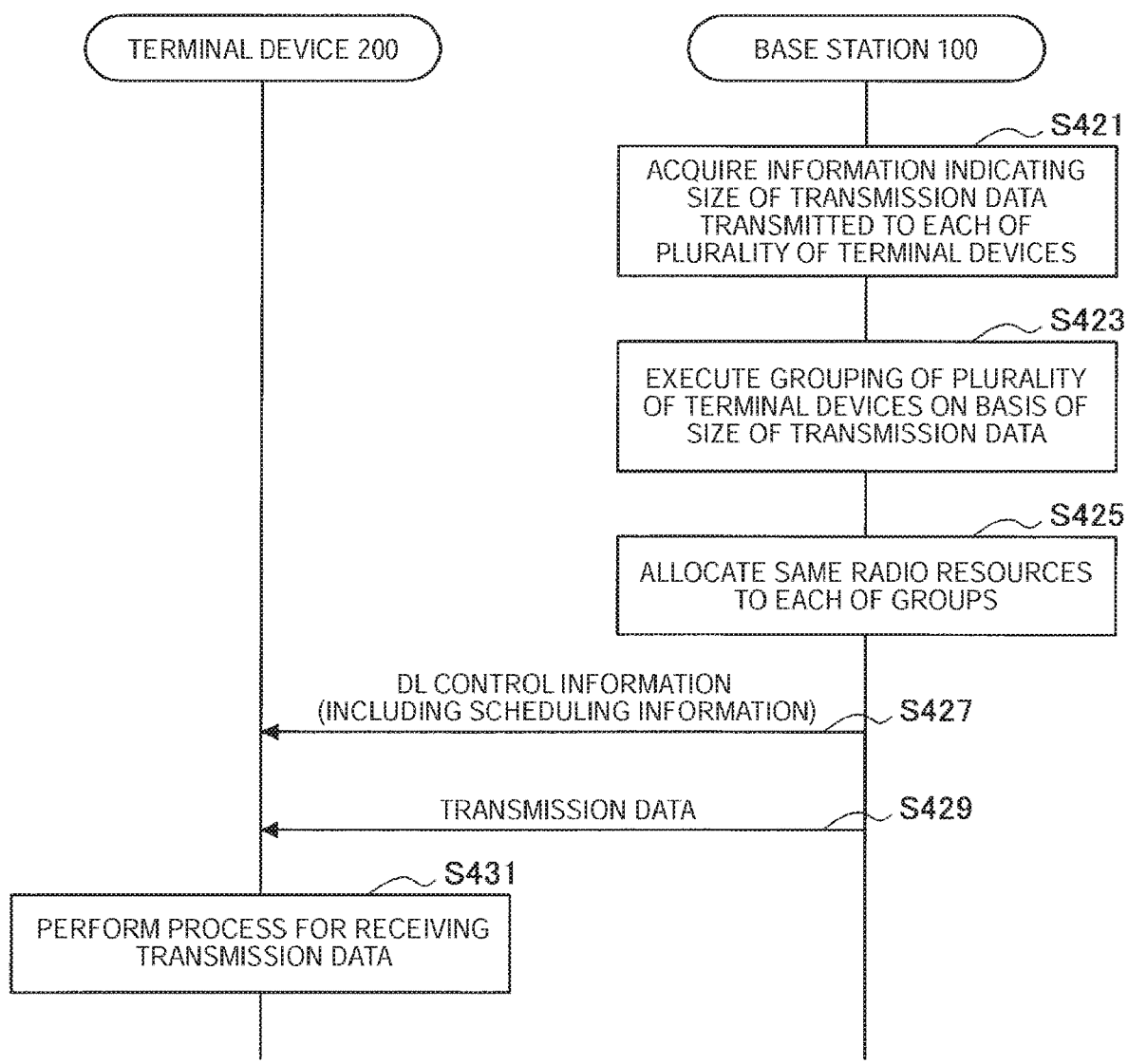
FIG. 14 is a sequence diagram showing a second example of a schematic flow of a process according to the first embodiment.

FIG. 14 is a sequence diagram showing a second example of a schematic flow of a process according to the first embodiment. The second example is an example of a case in which NOMA is used in downlink.

The base station 100 (the information acquisition unit 151) acquires information indicating sizes of transmission data to be transmitted to each of the plurality of terminal devices 200 that support NOMA (S421). The base station 100 (the information acquisition unit 151) performs grouping of the plurality of terminal devices 200 on the basis of the sizes of the transmission data (S423). Then, the base station 100 (the allocation unit 155) allocates the same radio resources (downlink resources) to each of groups obtained as a result of the grouping (S425).

The base station 100 (the reporting unit 159) reports the allocated radio resources to each of the plurality of terminal devices 200 (S427). Specifically, the base station 100 transmits, for example, downlink control information (DCI) including scheduling information to each of the plurality of terminal devices 200.

Further, the base station 100 transmits the transmission data to each of the plurality of terminal devices 200 (S429). The communication processing unit 161 of the base station 100 performs a process for transmitting the transmission data to each of one or more terminal devices 200 that belong to a group for each of the groups obtained from the grouping.

Each terminal device 200 (the information acquisition unit 151 thereof) acquires information (scheduling information) indicating the radio resources allocated to the terminal device 200. Then, the terminal device 200 receives the transmission data transmitted using the radio resources. The communication processing unit 243 of the terminal device 200 performs a process for receiving the transmission data using the radio resources (S431).

5. Second Embodiment

Next, a second embodiment of the present disclosure will be described with reference to FIGS. 15 and 16.

<5.1. Technical Features>

First, technical features of the second embodiment will be described.

In the second embodiment, a base station 100 (an allocation unit 155 thereof) allocates radio resources included in a resource pool for radio communication using NOMA to terminal devices 200 that support NOMA. Further, the base station 100 (the allocation unit 155) allocates other radio resources that are not included in the resource pool to other terminal devices that do not support NOMA.

Accordingly, radio resources can be more easily allocated to, for example, the terminal devices 200 that support NOMA and the other terminal devices that do not support NOMA. In addition, interference between the terminal devices 200 that support NOMA and the other terminal devices that do not support NOMA can be avoided.

(1) Non-Orthogonal Multiple Access (NOMA)

There is no difference in description of NOMA between the first and the second embodiments. Thus, overlapping description will be omitted here.

(2) Link Direction (a) NOMA in Uplink

NOMA is used in, for example, uplink. The resource pool in this case is a resource pool for uplink communication, and the radio resources are uplink resources.

(b) NOMA in Downlink

NOMA may be used in downlink. The resource pool in this case may be a resource pool for downlink communication, and the radio resources may be downlink resources.

(3) Characteristics of Resource Pool

The resource pool is, for example, a part of radio resources of a frequency band. There is no difference in description of this subject between the first and the second embodiments. Thus, overlapping description will be omitted here.

(4) Examples of Resource Pools

There is no difference in description of examples of resource pools between the first and the second embodiments. That is, the examples of FIGS. 10 to 12 may be examples of resource pools according to the second embodiment. Thus, overlapping description will be omitted here.

(5) Reporting to Terminal Device

The base station 100 reports, for example, various kinds of information to the terminal devices 200. There is no difference in description of this subject between the first and the second embodiments. Thus, overlapping description will be omitted here.

(6) Transmission/Reception (a) NOMA in Uplink

NOMA is used in, for example, uplink. Transmission and reception in this case will be described below.

(a-1) Terminal Device 200

A terminal device 200 (the information acquisition unit 241 thereof) acquires, for example, information indicating radio resources (i.e., uplink resources) included in the resource pool and the radio resources allocated to the terminal device 200. Then, the terminal device 200 transmits transmission data using the radio resources.

The communication processing unit 243 of the terminal device 200 performs, for example, a process for transmitting the transmission data of the terminal device 200 using the radio resources. The process includes, for example, mapping of signals of the transmission data to the radio resources. The process includes, for example, an interleaving process of IDMA.

(a-2) Base Station 100

The base station 100, for example, receives the transmission data transmitted by the terminal device 200 using the radio resources.

The communication processing unit 161 of the base station 100 performs, for example, a process for receiving the transmission data of the terminal device 200. The process includes, for example, de-mapping of the signals of the transmission data from the radio resources. The process includes, for example, a de-interleaving process of IDMA.

(b) NOMA in Downlink

NOMA may be used in downlink. Transmission and reception in this case will be described below.

(b-1) Terminal Device 200

The terminal device 200 (the information acquisition unit 241) may acquire information indicating radio resources (i.e., downlink resources) included in the resource pool and the radio resources allocated to the terminal device 200. Then, the terminal device 200 may receive transmission data transmitted using the radio resources.

The communication processing unit 243 of terminal device 200 may perform a process for receiving the transmission data of the terminal device 200 using the radio resources. The process may include, for example, de-mapping of the signals of the transmission data from the radio resources or may include a de-interleaving process of IDMA.

(b-2) Base Station 100

The base station 100 may transmit the transmission data to the terminal device 200 using the radio resources.

The communication processing unit 161 of the base station 100 may perform a process for transmitting the transmission data to the terminal device 200. The process may include mapping of the signals of the transmission data to the radio resources. The process may include an interleaving process of IDMA.

<5.2. Process Flow>

Next, examples of flows of processes according to the second embodiment will be described with reference to FIGS. 15 and 16.

(1) NOMA in Uplink

Figure 15:
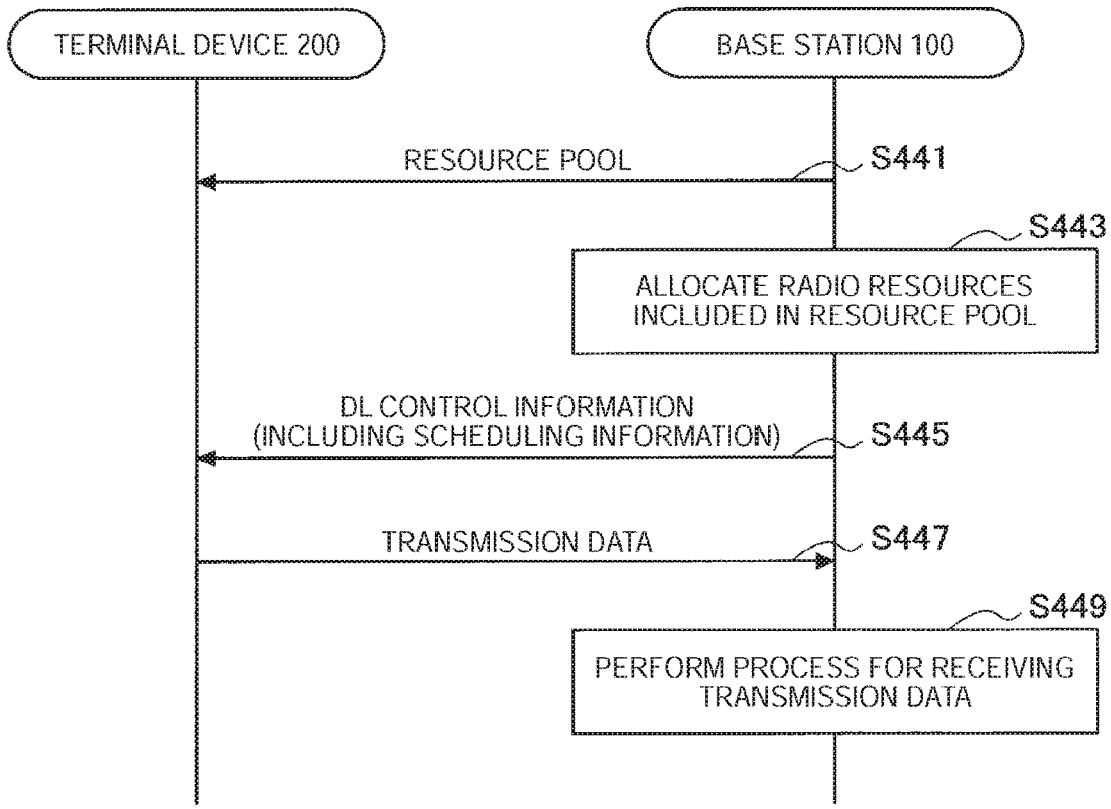
FIG. 15 is a sequence diagram showing a first example of a schematic flow of a process according to the second embodiment.

FIG. 15 is a sequence diagram showing a first example of a schematic flow of a process according to the second embodiment. The first example is an example of a case in which NOMA is used in uplink.

The base station 100 (the reporting unit 159) reports a resource pool for radio communication using NOMA (a resource pool for uplink communication using NOMA) to the terminal device 200 (S441). The base station 100 reports, to the terminal device 200, the resource pool included in, for example, system information or in a signaling message to the terminal device 200.

The base station 100 (the allocation unit 155) allocates radio resources (uplink resources) included in the resource pool to the terminal device 200 (S443).

The base station 100 (the reporting unit 159) reports the allocated radio resources to the terminal device 200 (S445). Specifically, for example, the base station 100 transmits downlink control information (DCI) including scheduling information to the terminal device 200.

The terminal device 200 (the information acquisition unit 151) acquires information (scheduling information) indicating the radio resources allocated to the terminal device 200. Then, the terminal device 200 transmits transmission data using the radio resources allocated to the terminal device 200 (S447). The communication processing unit 243 of the terminal device 200 performs a process for transmitting the transmission data using the radio resources.

The base station 100 receives the transmission data transmitted by the terminal device 200. The communication processing unit 161 of the base station 100 performs a process for receiving the transmission data (S449).

(2) NOMA in Uplink

Figure 16:
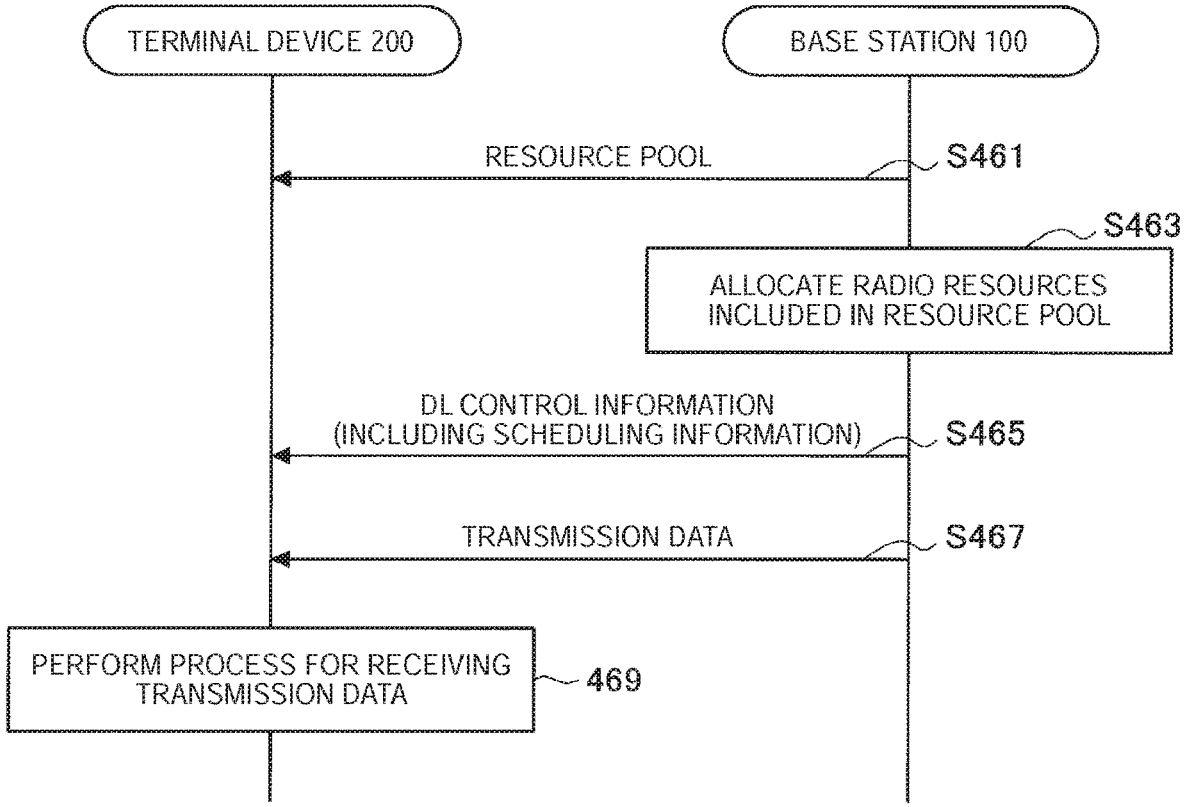
FIG. 16 is a sequence diagram showing a second example of a schematic flow of a process according to the second embodiment.

FIG. 16 is a sequence diagram showing a second example of a schematic flow of a process according to the second embodiment. The second example is an example of a case in which NOMA is used in downlink.

The base station 100 (the reporting unit 159) reports a resource pool for radio communication using NOMA (a resource pool for downlink communication using NOMA) to the terminal device 200 (S461). The base station 100 reports, to the terminal device 200, the resource pool included in, for example, system information or in a signaling message to the terminal device 200.

The base station 100 (the allocation unit 155) allocates radio resources (downlink resources) included in the resource pool to the terminal device 200 (S463).

The base station 100 (the reporting unit 159) reports the allocated radio resources to the terminal device 200 (S465). Specifically, for example, the base station 100 transmits downlink control information (DCI) including scheduling information to the terminal device 200.

Furthermore, the base station 100 (the reporting unit 159) transmits transmission data to the terminal device 200 (S467).

The terminal device 200 (the information acquisition unit 151) acquires information (scheduling information) indicating the radio resources allocated to the terminal device 200. Then, the terminal device 200 receives the transmission data transmitted using the radio resources. The communication processing unit 243 of the terminal device 200 performs a process for receiving the transmission data using the radio resources (S469).

6. Application Example

The technology of the present disclosure can be applied to various products. The base station 100 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 100 may be realized as another type of base station such as a node B or a base transceiver station (BTS). The base station 100 may include a main body that controls radio communication (also referred to as a base station device) and one or more remote radio heads (RRHs) disposed in a different place from the main body. In addition, various types of terminals to be described below may operate as the base station 100 by temporarily or semi-permanently executing the base station function. Furthermore, at least some of constituent elements of the base station 100 may be realized in a base station device or a module for a base station device.

In addition, the terminal device 200 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 200 may be realized as a terminal that performs machine-to-machine (M2M) communication (also referred to as a machine type communication (MTC) terminal). Furthermore, at least some of constituent elements of the terminal device 200 may be realized in a module mounted in such a terminal (for example, an integrated circuit module configured in one die).

<6.1. Application Example with Regard to Base Station>
(First Application Example)

Figure 17:
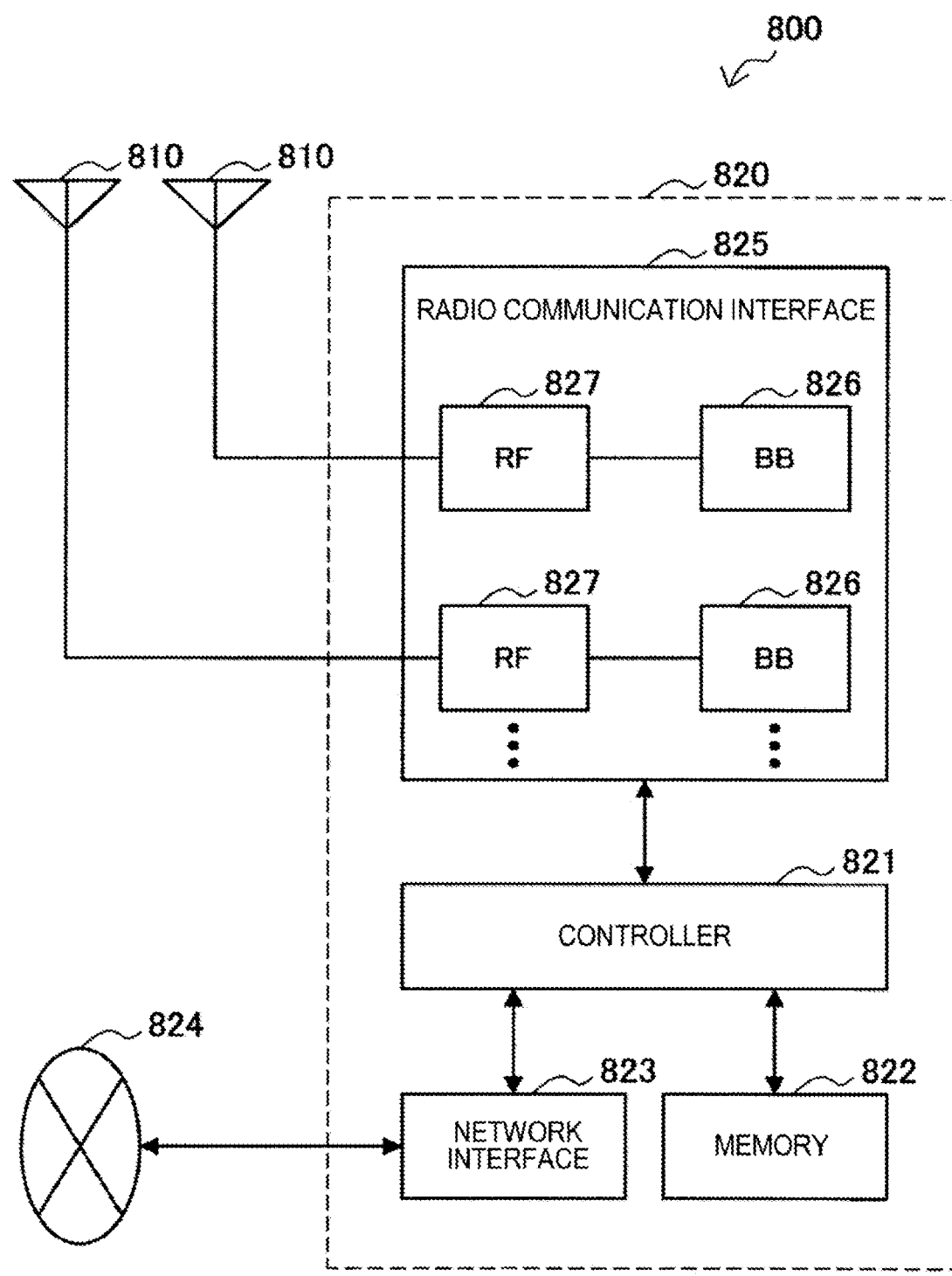
FIG. 17 is a block diagram illustrating a first example of a schematic configuration of an eNB.

FIG. 17 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 17. For example, the multiple antennas 810 may be compatible with multiple frequency bands used by the eNB 800. Although FIG. 17 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 17. For example, the multiple BB processors 826 may be compatible with multiple frequency bands used by the eNB 800. The radio communication interface 825 may include the multiple RF circuits 827, as illustrated in FIG. 17. For example, the multiple RF circuits 827 may be compatible with multiple antenna elements. Although FIG. 17 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 17, one or more structural elements included in the processing unit 150 (the information acquisition unit 151, the grouping unit 153, the allocation unit 155, the transmission power control unit 157, the reporting unit 159 and/or the communication processing unit 161) described with reference to FIG. 9 may be implemented by the radio communication interface 825. Alternatively, at least some of these constituent elements may be implemented by the controller 821. As an example, a module which includes a part (for example, the BB processor 826) or all of the radio communication interface 825 and/or the controller 821 may be mounted in eNB 800, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 800, and the radio communication interface 825 (for example, the BB processor 826) and/or the controller 821 may execute the program. As described above, the eNB 800, the base station device 820, or the module may be provided as a device which includes the one or more structural elements, and the program for causing the processor to function as the one or more structural elements may be provided. In addition, a readable recording medium in which the program is recorded may be provided.

In addition, in the eNB 800 shown in FIG. 17, the radio communication unit 120 described with reference to FIG. 5 may be implemented by the radio communication interface 825 (for example, the RF circuit 827). Moreover, the antenna unit 110 may be implemented by the antenna 810. In addition, the network communication unit 130 may be implemented by the controller 821 and/or the network interface 823.

(Second Application Example)

Figure 18:
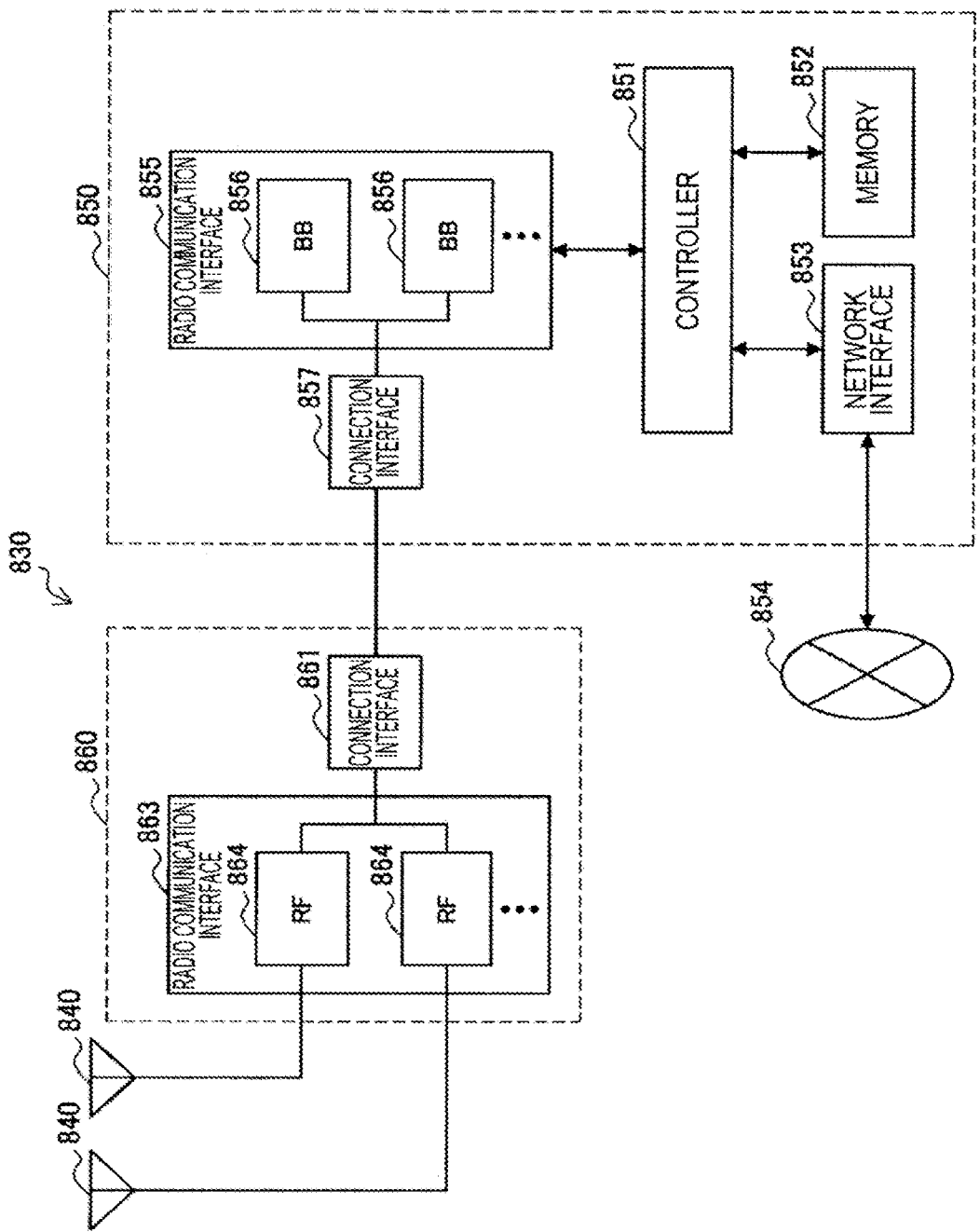
FIG. 18 is a block diagram illustrating a second example of the schematic configuration of the eNB.

FIG. 18 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 18. For example, the multiple antennas 840 may be compatible with multiple frequency bands used by the eNB 830. Although FIG. 18 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 17.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 17, except the BB processor 856 is connected to the RF circuit 864 of the RRH 860 via the connection interface 857. The radio communication interface 855 may include the multiple BB processors 856, as illustrated in FIG. 18. For example, the multiple BB processors 856 may be compatible with multiple frequency bands used by the eNB 830. Although FIG. 18 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 18. For example, the multiple RF circuits 864 may support multiple antenna elements. Although FIG. 18 illustrates the example in which the radio communication interface 863 includes the multiple RF circuits 864, the radio communication interface 863 may also include a single RF circuit 864.

In the eNB 830 shown in FIG. 18, one or more structural elements included in the processing unit 150 (the information acquisition unit 151, the grouping unit 153, the allocation unit 155, the transmission power control unit 157, the reporting unit 159 and/or the communication processing unit 161) described with reference to FIG. 5 may be implemented by the radio communication interface 855 and/or the radio communication interface 863. Alternatively, at least some of these constituent elements may be implemented by the controller 851. As an example, a module which includes a part (for example, the BB processor 856) or all of the radio communication interface 855 and/or the controller 851 may be mounted in eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the radio communication interface 855 (for example, the BB processor 856) and/or the controller 851 may execute the program. As described above, the eNB 830, the base station device 850, or the module may be provided as a device which includes the one or more structural elements, and the program for causing the processor to function as the one or more structural elements may be provided. In addition, a readable recording medium in which the program is recorded may be provided.

Figure 5:
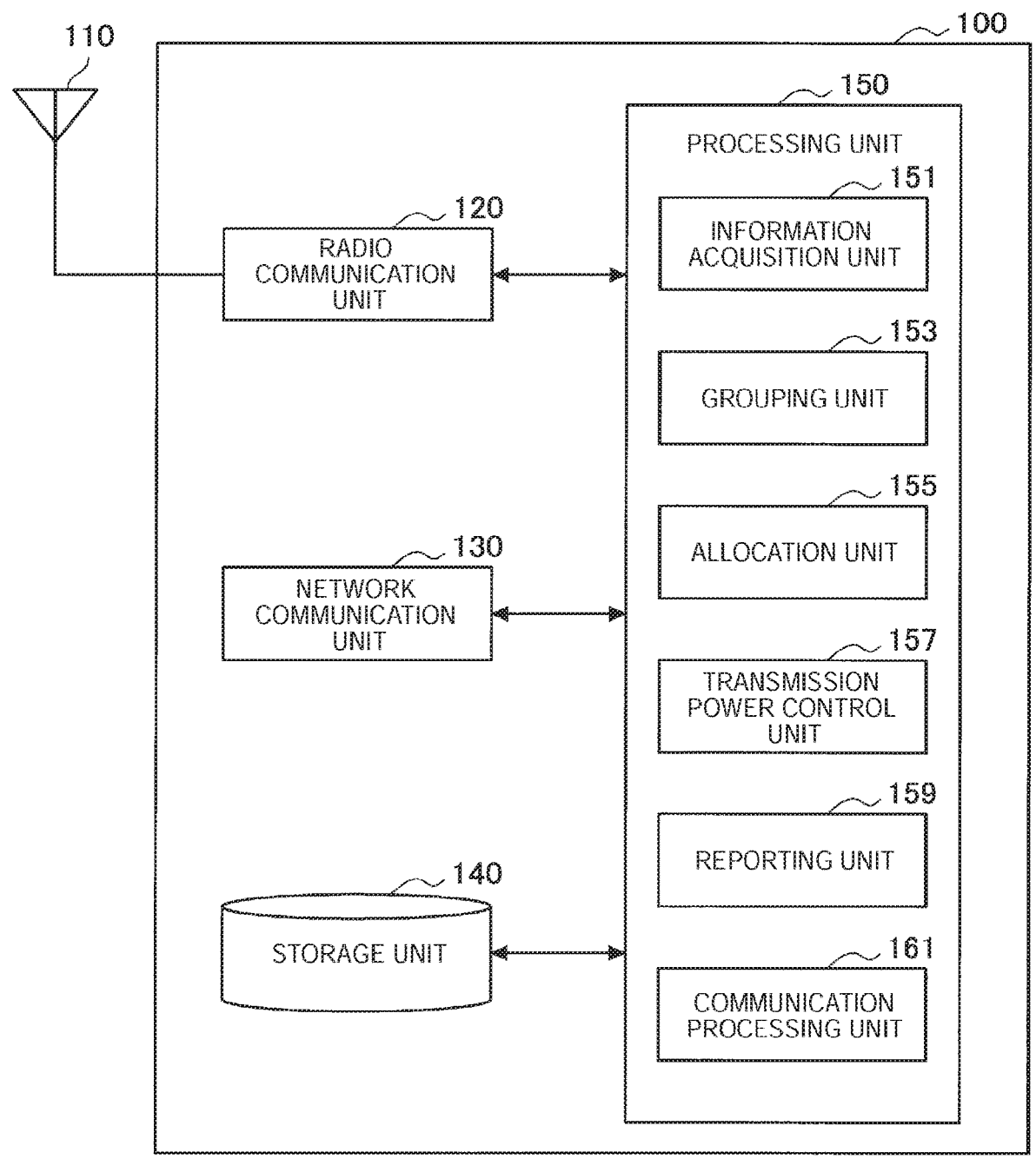
FIG. 5 is a block diagram illustrating an example of a configuration of a base station according to the embodiment.

In addition, in the eNB 830 shown in FIG. 18, the radio communication unit 120 described, for example, with reference to FIG. 5 may be implemented by the radio communication interface 863 (for example, the RF circuit 864).

Moreover, the antenna unit 110 may be implemented by the antenna 840. In addition, the network communication unit 130 may be implemented by the controller 851 and/or the network interface 853.

<6.2. Application Example with Regard to Terminal Device>

(First Application Example)

Figure 19:
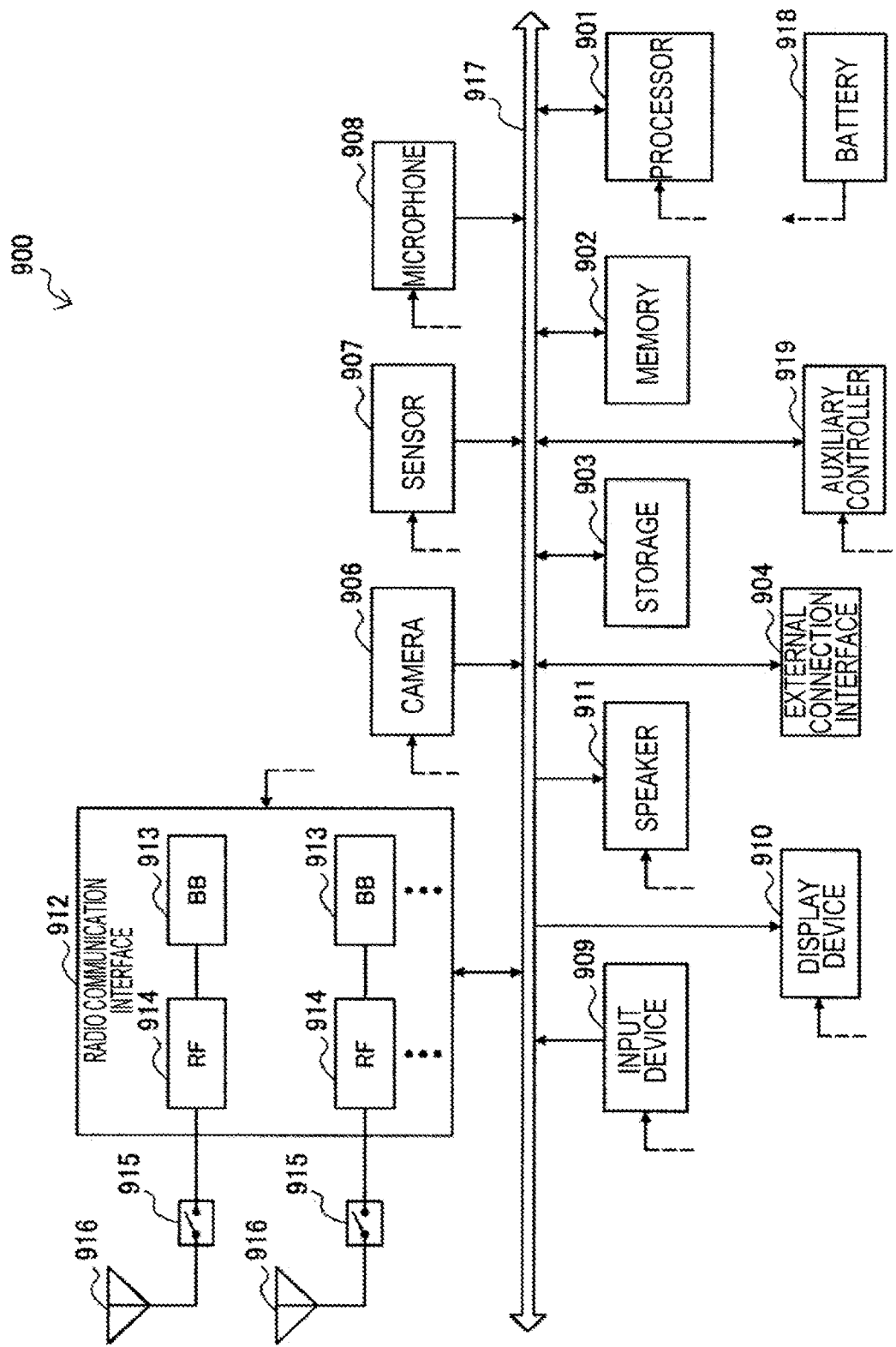
FIG. 19 is a block diagram illustrating an example of a schematic configuration of a smartphone.

FIG. 19 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 19. Although FIG. 19 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 19. Although FIG. 19 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 19 via feeder lines, which are partially shown as dashed lines in the figure. The auxiliary controller 919 operates a minimum necessary function of the smartphone 900, for example, in a sleep mode.

In the smartphone 900 shown in FIG. 19, the information acquisition unit 241 and/or the communication processing unit 243 described with reference to FIG. 6 may be implemented by the radio communication interface 912. Alternatively, at least some of these constituent elements may be implemented by the processor 901 or the auxiliary controller 919. As an example, a module which includes a part (for example, the BB processor 913) or all of the radio communication interface 912, the processor 901 and/or the auxiliary controller 919 may be mounted in the smartphone 900, and the information acquisition unit 241 and/or the communication processing unit 243 may be implemented by the module. In this case, the module may store a program for causing the processor to function as the information acquisition unit 241 and/or the communication processing unit 243 (i.e., a program for causing the processor to execute operations of the information acquisition unit 241 and/or the communication processing unit 243) and may execute the program. As another example, the program for causing the processor to function as the information acquisition unit 241 and/or the communication processing unit 243 may be installed in the smartphone 900, and the radio communication interface 912 (for example, the BB processor 913), the processor 901 and/or the auxiliary controller 919 may execute the program. As described above, the smartphone 900 or the module may be provided as a device which includes the information acquisition unit 241 and/or the communication processing unit 243, and the program for causing the processor to function as the information acquisition unit 241 and/or the communication processing unit 243 may be provided. In addition, a readable recording medium in which the program is recorded may be provided.

Figure 6:
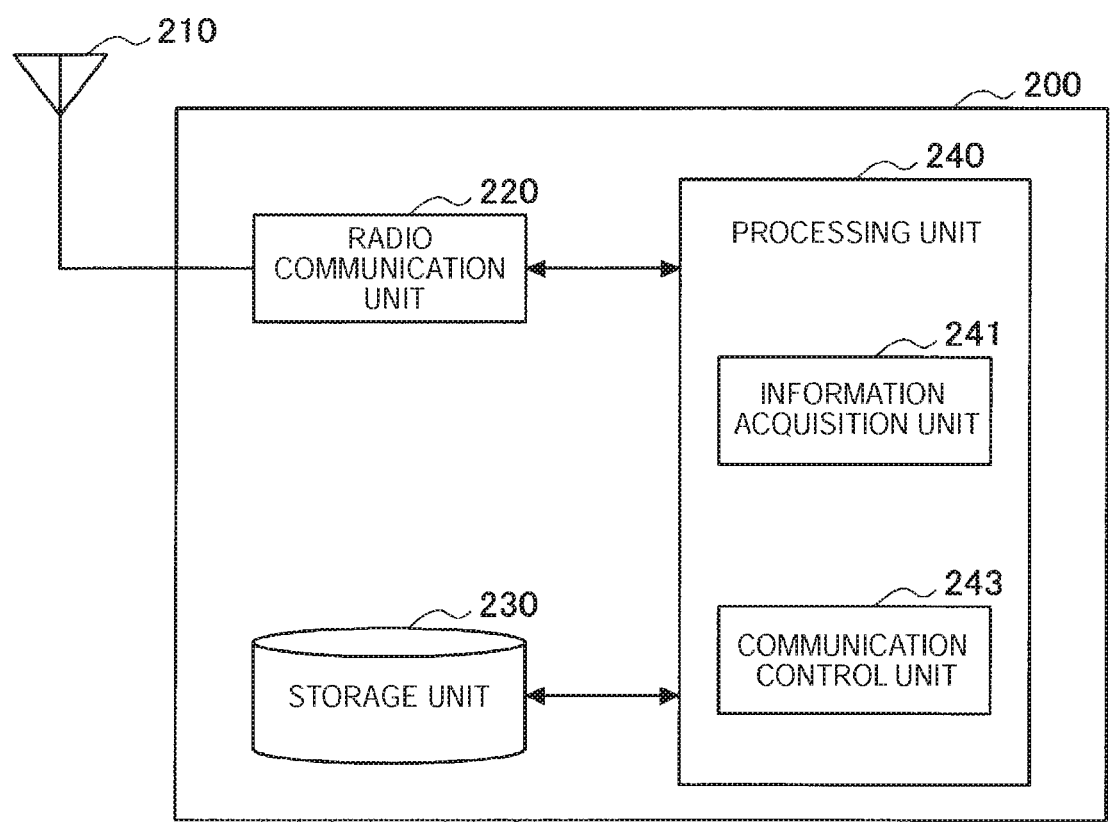
FIG. 6 is a block diagram illustrating an example of a configuration of a terminal device according to the embodiment.

In addition, in the smartphone 900 shown in FIG. 19, the radio communication unit 220 described, for example, with reference to FIG. 6 may be implemented by the radio communication interface 912 (for example, the RF circuit 914). Moreover, the antenna unit 210 may be implemented by the antenna 916.

(Second Application Example)

Figure 20:
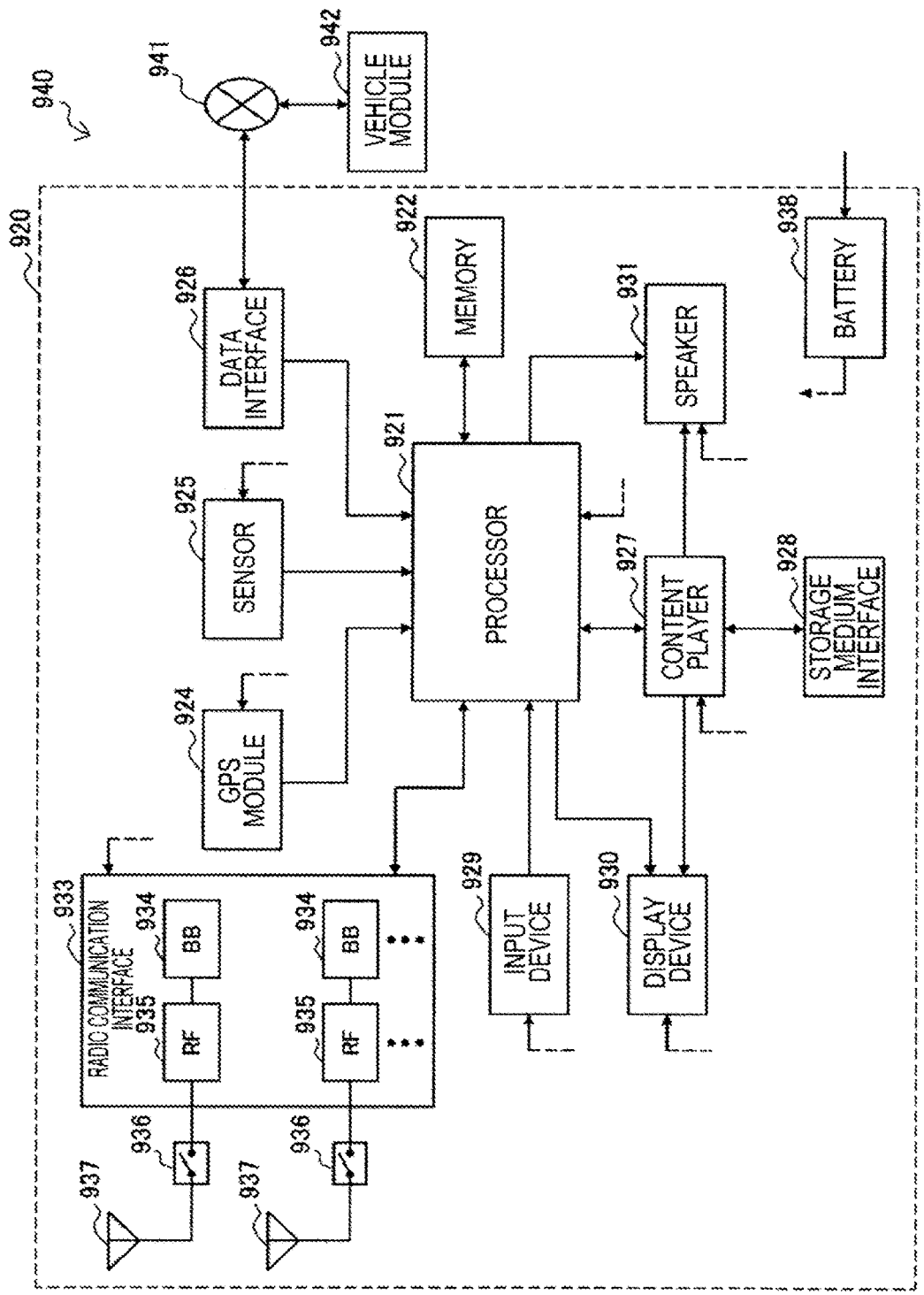
FIG. 20 is a block diagram illustrating an example of a schematic configuration of a car navigation device.

FIG. 20 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 20. Although FIG. 20 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 20. Although FIG. 20 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 20 via feeder lines that are partially shown as dashed lines in the figure. The battery 938 accumulates power supplied form the vehicle.

In the car navigation device 920 shown in FIG. 32, the information acquisition unit 241 and/or the communication processing unit 243 described with reference to FIG. 6 may be implemented by the radio communication interface 933. Alternatively, at least some of these constituent elements may be implemented by the processor 921. As an example, a module which includes a part (for example, the BB processor 934) or all of the radio communication interface 933 and/or the processor 921 may be mounted in the car navigation device 920, and the information acquisition unit 241 and/or the communication processing unit 243 may be implemented by the module. In this case, the module may store a program for causing the processor to function as the information acquisition unit 241 and/or the communication processing unit 243 (i.e., a program for causing the processor to execute operations of the information acquisition unit 241 and/or the communication processing unit 243) and may execute the program. As another example, the program for causing the processor to function as the information acquisition unit 241 and/or the communication processing unit 243 may be installed in the car navigation device 920, and the radio communication interface 933 (for example, the BB processor 934) and/or the processor 921 may execute the program. As described above, the car navigation device 920 or the module may be provided as a device which includes the information acquisition unit 241 and/or the communication processing unit 243, and the program for causing the processor to function as the information acquisition unit 241 and/or the communication processing unit 243 may be provided. In addition, a readable recording medium in which the program is recorded may be provided.

In addition, in the car navigation device 920 shown in FIG. 20, the radio communication unit 220 described, for example, with reference to FIG. 6 may be implemented by the radio communication interface 933 (for example, the RF circuit 935). Moreover, the antenna unit 210 may be implemented by the antenna 937.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the information acquisition unit 241 and/or the communication processing unit 243. The vehicle module 942 generates vehicle data such as vehicle speed, engine speed, and trouble information, and outputs the generated data to the in-vehicle network 941.

7. Conclusion

So far, the communication devices and processes according to the embodiments of the present disclosure have been described with reference to FIGS. 4 to 16.

(1) First Embodiment

In the first embodiment, the base station 100 includes the grouping unit 153 which performs grouping of a plurality of terminal devices 200 on the basis of sizes of transmission data of each of the plurality of terminal devices 200 that support non-orthogonal multiple access, and the allocation unit 155 which allocates the same radio resources to each of groups obtained as a result of the grouping.

In the first embodiment, each terminal device 200 includes the information acquisition unit 241 which acquires information indicating radio resources to be allocated to the terminal device 200 and the communication processing unit 243 which performs a process for transmitting or receiving transmission data of the terminal device 200 using the radio resources. The terminal device 200 is included among a plurality of terminal devices 200 that support non-orthogonal multiple access, and belongs to a group obtained as a result of grouping of the plurality of terminal devices 200 performed on the basis of sizes of the transmission data of each of the plurality of terminal devices 200. The radio resources are radio resources allocated to one or more terminal devices 200 that belong to the group.

Accordingly, radio resources can be used more efficiently in, for example, non-orthogonal multiple access.

(2) Second Embodiment

In the second embodiment, the base station 100 includes the allocation unit 155 which allocates radio resources included in a resource pool for radio communication using non-orthogonal multiple access to a terminal device 200 that support non-orthogonal multiple access and allocates other radio resources that are not included in the resource pool to another terminal device that does not support non-orthogonal multiple access.

In the second embodiment, the terminal device 200 includes the information acquisition unit 241 which acquires information indicating radio resources included in a resource pool for radio communication using non-orthogonal multiple access and the radio resources allocated to the terminal device 200 that supports non-orthogonal multiple access, and the communication processing unit 243 which performs a process for transmitting or receiving transmission data of the terminal device 200 using the radio resources.

Accordingly, radio resources can be more easily allocated to, for example, terminal devices 200 that support non-orthogonal multiple access and terminal devices that do not support non-orthogonal multiple access.

So far, exemplary embodiments of the present disclosure have been described with reference to accompanying diagrams, but it is a matter of course that the present disclosure is not limited thereto. It is obvious that a person skilled in the art can conceive various modified examples or altered examples within the scope described in the claims, and it is understood that such examples also belong to the technical scope of the present disclosure.

Processing steps in processes of the present specification may not necessarily be executed in, for example, a time series manner in the order described in the flowcharts or sequence diagrams. The processing steps in the processes may also be executed in, for example, a different order from the order described in the flowcharts or sequence diagrams, or may be executed in parallel.

In addition, a computer program for causing a processor (for example, a CPU, a DSP, or the like) provided in a device of the present specification (for example, a base station, a base station device or a module for a base station device, or a terminal device or a module for a terminal device) to function as a constituent element of the device (for example, the information acquisition unit, the grouping unit, the allocation unit, the transmission power control unit, the reporting unit, the communication processing unit and/or the like) (in other words, a computer program for causing the processor to execute operations of the constituent element of the device) can also be created. In addition, a recording medium in which the computer program is recorded may also be provided. Further, a device that includes a memory in which the computer program is stored and one or more processors that can execute the computer program (a base station, a base station device or a module for a base station device, or a terminal device or a module for a terminal device) may also be provided. In addition, a method including an operation of the constituent element of the device (for example, the information acquisition unit, the grouping unit, the allocation unit, the transmission power control unit, the reporting unit, the communication processing unit and/or the like) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A device including:

a grouping unit configured to perform grouping of a plurality of terminal devices that support non-orthogonal multiple access on the basis of a size of transmission data of each of the plurality of terminal devices; and an allocation unit configured to allocate the same radio resources to each of groups obtained as a result of the grouping.

(2)

The device according to (1), wherein the grouping unit performs the grouping for each of subframes on the basis of the size of the transmission data.

(3)

The device according to (1) or (2), wherein the grouping unit performs the grouping further on the basis of one or a combination of a modulation scheme and a coding rate applied to the transmission data.

(4)

The device according to (3), wherein the grouping unit performs the grouping for each modulation scheme or for each coding rate.

(5)

The device according to any one of (1) to (4), wherein the grouping unit performs the grouping further on the basis of information regarding a position of each of the plurality of terminal devices.

(6)

The device according to (5), wherein the information regarding the position includes information indicating the position of each of the plurality of terminal devices, information indicating a timing advance of each of the plurality of terminal devices, or information indicating an angle of arrival of each of the plurality of terminal devices.

(7)

The device according to (5) or (6), wherein the grouping unit performs the grouping such that terminal devices positioned at a close distance do not belong to the same group.

(8)

The device according to any one of (1) to (7), wherein the grouping unit performs the grouping further on the basis of information regarding a processing capability or a memory size of each of the plurality of terminal devices.

(9)

The device according to (8), wherein the grouping unit performs the grouping such that terminal devices having similar processing capabilities or memory sizes belong to the same group.

(10)

The device according to any one of (1) to (9), wherein the transmission data is transmission data transmitted by each of the plurality of terminal devices, and the same radio resources are the same uplink resources.

(11)

The device according to (10), further including:

a transmission power control unit configured to, when two or more terminal devices belong to a group obtained as a result of the grouping, control transmission power of transmission data transmitted by the two or more terminal devices such that the difference in levels of reception power of the transmission data transmitted by the two or more terminal devices is large.

(12)

The device according to any one of (1) to (9), wherein the transmission data is transmission data transmitted to each of the plurality of terminal devices, and the same radio resources are the same downlink resources.

(13)

The device according to any one of (1) to (12), wherein the non-orthogonal multiple access is interleave division multiple access.

(14)

The device according to any one of (1) to (13), wherein the transmission data is a transport block.

(15)

The device according to any one of (1) to (14), wherein the same radio resources are radio resources included in a resource pool for radio communication using the non-orthogonal multiple access, and the resource pool is a part of radio resources of a frequency band.

(16)

The device according to (15), wherein the same radio resources are radio resources limited in at least one of a frequency direction and a time direction among the radio resources.

(17)

The device according to (15) or (16), wherein the allocation unit allocates other radio resources that are not included in the resource pool to a terminal device that does not support the non-orthogonal multiple access.

(18)

The device according to any one of (15) to (17), further including:

a reporting unit configured to report the resource pool to the plurality of terminal devices.

(19)

A method performed by a processor, the method including:

performing grouping of a plurality of terminal devices that support non-orthogonal multiple access on the basis of a size of transmission data of each of the plurality of terminal devices; and allocating the same radio resources to each of groups obtained as a result of the grouping.

(20)

A device including:

an acquisition unit configured to acquire information indicating radio resources to be allocated to a terminal device; and a communication processing unit configured to perform a process for transmitting or receiving transmission data of the terminal device using the radio resources, wherein the terminal device is included in a plurality of terminal devices that support non-orthogonal multiple access, and belongs to a group obtained as a result of grouping of the plurality of terminal devices performed on the basis of a size of transmission data of each of the plurality of terminal devices, and the radio resources are radio resources allocated to one or more terminal devices that belong to the group.

(21)

A program causing a processor to execute:

performing grouping of a plurality of terminal devices that support non-orthogonal multiple access on the basis of a size of transmission data of each of the plurality of terminal devices; and allocating the same radio resources to each of groups obtained as a result of the grouping.

(22)

A readable recording medium having a program recorded thereon, the program causing a processor to execute:

performing grouping of a plurality of terminal devices that support non-orthogonal multiple access on the basis of a size of transmission data of each of the plurality of terminal devices; and allocating the same radio resources to each of groups obtained as a result of the grouping.

(23)

A method performed by a processor, the method including:

acquiring information indicating radio resources to be allocated to a terminal device; and performing a process for transmitting or receiving transmission data of the terminal device using the radio resources, wherein the terminal device is included in a plurality of terminal devices that support non-orthogonal multiple access, and belongs to a group obtained as a result of grouping of the plurality of terminal devices performed on the basis of a size of transmission data of each of the plurality of terminal devices, and the radio resources are radio resources allocated to one or more terminal devices that belong to the group.

(24)

A program causing a processor to execute:

acquiring information indicating radio resources to be allocated to a terminal device; and performing a process for transmitting or receiving transmission data of the terminal device using the radio resources, wherein the terminal device is included in a plurality of terminal devices that support non-orthogonal multiple access, and belongs to a group obtained as a result of grouping of the plurality of terminal devices performed on the basis of a size of transmission data of each of the plurality of terminal devices, and the radio resources are radio resources allocated to one or more terminal devices that belong to the group.

(25)

A readable recording medium having a program recorded thereon, the program causing a processor to execute:

acquiring information indicating radio resources to be allocated to a terminal device; and performing a process for transmitting or receiving transmission data of the terminal device using the radio resources, wherein the terminal device is included in a plurality of terminal devices that support non-orthogonal multiple access, and belongs to a group obtained as a result of grouping of the plurality of terminal devices performed on the basis of a size of transmission data of each of the plurality of terminal devices, and the radio resources are radio resources allocated to one or more terminal devices that belong to the group.

(26)

A device including:

an allocation unit configured to allocate radio resources included in a resource pool for radio communication using non-orthogonal multiple access to a terminal device that supports the non-orthogonal multiple access, and other radio resources that are not included in the resource pool to another terminal device that does not support the non-orthogonal multiple access.

(27)

A device including:

an acquisition unit configured to acquire information indicating radio resources included in a resource pool for radio communication using non-orthogonal multiple access and the radio resources allocated to a terminal device that supports the non-orthogonal multiple access; and a communication processing unit configured to perform a process for transmitting or receiving transmission data of the terminal device using the radio resources.

(28)

A method performed by a processor, the method including:

allocating radio resources included in a resource pool for radio communication using non-orthogonal multiple access to a terminal device that supports the non-orthogonal multiple access; and allocating other radio resources that are not included in the resource pool to another terminal device that does not support the non-orthogonal multiple access.

(29)

A program causing a processor to execute:

allocating radio resources included in a resource pool for radio communication using non-orthogonal multiple access to a terminal device that supports the non-orthogonal multiple access; and allocating other radio resources that are not included in the resource pool to another terminal device that does not support the non-orthogonal multiple access.

(30)

A readable recording medium having a program recorded thereon, the program causing a processor to execute:

allocating radio resources included in a resource pool for radio communication using non-orthogonal multiple access to a terminal device that supports the non-orthogonal multiple access; and allocating other radio resources that are not included in the resource pool to another terminal device that does not support the non-orthogonal multiple access.

(31)

A method performed by a processor, the method including:

acquiring information indicating radio resources included in a resource pool for radio communication using non-orthogonal multiple access and the radio resources allocated to a terminal device that supports the non-orthogonal multiple access; and performing a process for transmitting or receiving transmission data of the terminal device using the radio resources.

(32)

A program causing a processor to execute:

acquiring information indicating radio resources included in a resource pool for radio communication using non-orthogonal multiple access and the radio resources allocated to a terminal device that supports the non-orthogonal multiple access; and performing a process for transmitting or receiving transmission data of the terminal device using the radio resources.

(33)

A readable recording medium having a program recorded thereon, the program causing a processor to execute:

acquiring information indicating radio resources included in a resource pool for radio communication using non-orthogonal multiple access and the radio resources allocated to a terminal device that supports the non-orthogonal multiple access; and performing a process for transmitting or receiving transmission data of the terminal device using the radio resources.

REFERENCE SIGNS LIST 1 system
100 base station
151 information acquisition unit
153 grouping unit
155 allocation unit
157 transmission power control unit
159 reporting unit
161 communication processing unit
200 terminal device
241 information acquisition unit
243 communication processing unit

The invention claimed is:

1. A device comprising:

processing circuitry configured to group a plurality of terminal devices that support superposition power control (SPC) non-orthogonal multiple access (NOMA) on the basis of a size of transmission data to be transmitted by respective of the plurality of terminal devices; and allocate the same radio resources to terminal devices in each group obtained as a result of the grouping so as to provide a needed amount of radio resources to support transmission of the transmission data for the terminal devices in each group, the allocation of the same radio resources requires the terminal devices in each group to use the same radio resources for SPC NOMA communications; and transmit data to the terminal devices in each group informing the terminal devices of the same radio resources that are to be used by the terminal devices in each group, wherein the same radio resources includes using at the same time the same time and frequency resource blocks that are commonly used by the terminal devices in each group, the same radio resources are radio resources included in a resource pool for radio communication using the non-orthogonal multiple access, the resource pool is a part of radio resources of a frequency band, and the processing circuitry allocates other radio resources that are not included in the resource pool to a terminal device that does not support the non-orthogonal multiple access.

2. The device according to claim 1, wherein the processing circuitry performs the grouping for each of subframes on the basis of the size of the transmission data.

3. The device according to claim 1, wherein the processing circuitry performs the grouping further on the basis of one or a combination of a modulation scheme and a coding rate applied to the transmission data.

4. The device according to claim 3, wherein the processing circuitry performs the grouping for each modulation scheme or for each coding rate.

5. The device according to claim 1, wherein the processing circuitry performs the grouping further on the basis of information regarding a position of each of the plurality of terminal devices.

6. The device according to claim 5, wherein the information regarding the position includes information indicating the position of each of the plurality of terminal devices, information indicating a timing advance of each of the plurality of terminal devices, or information indicating an angle of arrival of each of the plurality of terminal devices.

7. The device according to claim 5, wherein the processing circuitry performs the grouping such that terminal devices positioned at a close distance do not belong to the same group.

8. The device according to claim 1, wherein the processing circuitry performs the grouping further on the basis of information regarding a processing capability or a memory size of each of the plurality of terminal devices.

9. The device according to claim 8, wherein the processing circuitry performs the grouping such that terminal devices having similar processing capabilities or memory sizes belong to the same group.

10. The device according to claim 1,
wherein the transmission data is transmission data transmitted by each of the plurality of terminal devices, and
the same radio resources are the same uplink resources.

11. The device according to claim 10, wherein:
the processing circuitry is further configured to, when two or more terminal devices belong to a group obtained as a result of the grouping, control transmission power of transmission data transmitted by the two or more terminal devices such that the difference in levels of reception power of the transmission data transmitted by the two or more terminal devices is greater than a predetermined threshold.

12. The device according to claim 1,
wherein the transmission data is transmission data transmitted to each of the plurality of terminal devices, and
the same radio resources are the same downlink resources.

13. The device according to claim 1, wherein the non-orthogonal multiple access is interleave division multiple access.

14. The device according to claim 1, wherein the size of the transmission data is a size of a transport block.

15. The device according to claim 1, wherein the same radio resources are radio resources limited in at least one of a frequency direction and a time direction among the radio resources.

16. The device according to claim 1, wherein the processing circuitry is further configured to report the resource pool to the plurality of terminal devices.

17. A method performed by processing circuitry, the method comprising:
grouping of a plurality of terminal devices that superposition power control (SPC) non-orthogonal multiple access (NOMA) on the basis of a size of transmission data to be transmitted by respective of the plurality of terminal devices;
allocating the same radio resources to terminal devices in each group obtained as a result of the grouping so as to provide a needed amount of radio resources to support transmission of the transmission data for the terminal devices in each group, the allocating of the same radio resources requires the terminal devices in each group to use the same radio resources for SPC NOMA communications transmitting data to the terminal devices in each group informing the terminal devices of the same radio resources that are to be used by the terminal devices in each group, wherein the same radio resources includes using at the same time the same time and frequency resource blocks that are commonly used by the terminal devices in each group, the same radio resources are radio resources included in a resource pool for radio communication using the non-orthogonal multiple access, the resource pool is a part of radio resources of a frequency band, and the method further allocating other radio resources that are not included in the resource pool to a terminal device that does not support the non-orthogonal multiple access.

18. A device comprising:
processing circuitry configured to
acquire information indicating radio resources to be allocated to a terminal device; and
perform a process for transmitting or receiving transmission data of the terminal device using the radio resources,
wherein the terminal device is included in a plurality of terminal devices that support superposition power control (SPC) non-orthogonal multiple access (NOMA), and belongs to a group obtained as a result of grouping of the plurality of terminal devices performed on the basis of a size of transmission data to be transmitted by respective of the plurality of terminal devices, and
the radio resources being same radio resources allocated to one or more terminal devices that belong to the group so as to provide a needed amount of radio resources to support transmission of the transmission data for the terminal devices in each group, the allocation of the same radio resources requires the terminal devices in each group to use the same radio resources for SPC NOMA communications, and transmit data to the terminal devices in each group informing the terminal devices of the same radio resources that are to be used by the terminal devices in each group, wherein the same radio resources includes using at the same time and frequency resource blocks that are commonly used by the terminal devices in each group, the same radio resources are radio resources included in a resource pool for radio communication using the non-orthogonal multiple access, the resource pool is a part of radio resources of a frequency band, and the processing circuitry allocates other radio resources that are not included in the resource pool to a terminal device that does not support the non-orthogonal multiple access.

* * * * *